(12) United States Patent
Miyamoto et al.

(10) Patent No.: US 9,327,191 B2
(45) Date of Patent: May 3, 2016

(54) METHOD AND APPARATUS FOR ENHANCED VIRTUAL CAMERA CONTROL WITHIN 3D VIDEO GAMES OR OTHER COMPUTER GRAPHICS PRESENTATIONS PROVIDING INTELLIGENT AUTOMATIC 3D-ASSIST FOR THIRD PERSON VIEWPOINTS

(75) Inventors: Shigeru Miyamoto, Kyoto (JP); Eiji Aonuma, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 2343 days.

(21) Appl. No.: 11/745,747

(22) Filed: May 8, 2007

(65) Prior Publication Data

US 2007/0270215 A1    Nov. 22, 2007

Related U.S. Application Data

(60) Provisional application No. 60/798,317, filed on May 8, 2006.

(51) Int. Cl.
*A63F 13/42* (2014.01)
*A63F 13/40* (2014.01)
(Continued)

(52) U.S. Cl.
CPC ............... *A63F 13/10* (2013.01); *A63F 13/525* (2014.09); *A63F 13/40* (2014.09); *A63F 13/42* (2014.09); *A63F 13/422* (2014.09); *A63F 13/426* (2014.09);
(Continued)

(58) Field of Classification Search
CPC ................ A63F 2300/6661; A63F 2300/6669; A63F 2300/6676; A63F 2300/6684; A63F 2300/8076; A63F 13/40; A63F 13/42; A63F 13/422; A63F 13/426; A63F 13/50; A63F 13/52; A63F 13/525; A63F 13/5252; A63F 13/5255; A63F 13/5258
USPC ....................................... 463/31–33
See application file for complete search history.

(56) References Cited

U.S. PATENT DOCUMENTS 4,720,703 A    1/1988  Schnarel, Jr. et al.
5,075,673 A   12/1991  Yanker
(Continued)

FOREIGN PATENT DOCUMENTS

JP              116343         9/1995

OTHER PUBLICATIONS

U.S. Appl. No. 12/222,873 to Haigh-Hutchinson, filed Aug. 18, 2008.
(Continued)

*Primary Examiner* — William H McCulloch, Jr.
(74) *Attorney, Agent, or Firm* — Nixon & Vanderhye P.C.

(57) ABSTRACT

A pivoting camera viewpoint is provided so that when an animated game character uses a bow and arrow or other weapon, the camera adopts a third person 3D view based on the relative position of the game character and the target that game character is aiming his bow at. The user positions a target cursor on the desired target. This causes an imaginary line segment or plane to be drawn in 3D space between the desired target and the game character (or possibly the game character's bow). The imaginary line segment or plane continues through and past the game character, and the character keeps the weapon, if it is a missile weapon, pointed along this line segment. Additionally, the player can lock onto a target, and freely move a character around. While in lock-on mode, the camera automatically repositions itself to keep both the character and the target visible to a player.

16 Claims, 20 Drawing Sheets

(51) Int. Cl.
*A63F 13/525* (2014.01)
*A63F 13/50* (2014.01)
*A63F 13/52* (2014.01)
*A63F 13/422* (2014.01)
*A63F 13/426* (2014.01)
*A63F 13/5252* (2014.01)
*A63F 13/5255* (2014.01)
*A63F 13/5258* (2014.01)

(52) U.S. Cl.
CPC ............... *A63F 13/50* (2014.09); *A63F 13/52* (2014.09); *A63F 13/5252* (2014.09); *A63F 13/5255* (2014.09); *A63F 13/5258* (2014.09); *A63F 2300/303* (2013.01); *A63F 2300/306* (2013.01); *A63F 2300/6661* (2013.01); *A63F 2300/6669* (2013.01); *A63F 2300/6676* (2013.01); *A63F 2300/6684* (2013.01); *A63F 2300/8076* (2013.01)

(56) References Cited

U.S. PATENT DOCUMENTS

| | | | |
|---|---|---|---|
| 5,351,966 A * | 10/1994 | Tohyama et al. | 463/2 |
| 5,973,704 A * | 10/1999 | Nishiumi et al. | 345/475 |
| 6,050,896 A * | 4/2000 | Hanado et al. | 463/32 |
| 6,097,371 A | 8/2000 | Siddiqui et al. | |
| 6,097,387 A | 8/2000 | Sciammarella et al. | |
| 6,155,926 A * | 12/2000 | Miyamoto et al. | 463/32 |
| 6,165,073 A | 12/2000 | Miyamoto | |
| 6,196,919 B1 * | 3/2001 | Okubo | 463/32 |
| 6,220,962 B1 * | 4/2001 | Miyamoto et al. | 463/32 |
| 6,241,609 B1 | 6/2001 | Rutgers | |
| 6,259,431 B1 | 7/2001 | Futatsugi et al. | |
| 6,283,861 B1 * | 9/2001 | Kawai et al. | 463/43 |
| 6,304,267 B1 * | 10/2001 | Sata | 345/427 |
| 6,314,426 B1 | 11/2001 | Martin et al. | |
| 6,323,895 B1 * | 11/2001 | Sata | 348/39 |
| 6,354,944 B1 | 3/2002 | Takahashi et al. | |
| 6,500,069 B1 | 12/2002 | Ohiba et al. | |
| 6,503,144 B1 * | 1/2003 | Rimoto et al. | 463/4 |
| 6,626,760 B1 | 9/2003 | Miyamoto et al. | |
| 6,821,204 B2 * | 11/2004 | Aonuma et al. | 463/32 |
| 6,835,136 B2 | 12/2004 | Kitao | |
| 6,878,065 B2 * | 4/2005 | Yamamoto et al. | 463/31 |
| 6,966,837 B1 * | 11/2005 | Best | 463/33 |
| 6,972,756 B1 * | 12/2005 | Yamamoto | 345/419 |
| 6,972,776 B2 | 12/2005 | Davis et al. | |
| 7,071,919 B2 | 7/2006 | Hinckley et al. | |
| 7,470,195 B1 * | 12/2008 | Baldwin et al. | 463/33 |
| 7,585,224 B2 * | 9/2009 | Dyke-Wells | 463/31 |
| 7,697,015 B2 * | 4/2010 | Nishimura | 345/640 |
| 7,731,588 B2 * | 6/2010 | Templeman | 463/38 |
| 7,737,968 B2 * | 6/2010 | Haga et al. | 345/419 |
| 7,942,745 B2 * | 5/2011 | Ikeda et al. | 463/38 |
| 7,963,833 B2 * | 6/2011 | Novak et al. | 463/2 |
| 8,047,915 B2 * | 11/2011 | Lyle et al. | 463/31 |
| 8,157,651 B2 * | 4/2012 | Ohta et al. | 463/37 |
| 8,226,478 B2 * | 7/2012 | Komatsumoto | 463/32 |
| 8,246,455 B2 * | 8/2012 | Kawabata | 463/32 |
| 8,259,112 B2 * | 9/2012 | Kuroda et al. | 345/427 |
| 8,277,316 B2 * | 10/2012 | Haigh-Hutchinson | 463/31 |
| 8,282,493 B2 * | 10/2012 | Roman et al. | 463/51 |
| 8,409,003 B2 * | 4/2013 | Ikeda | 463/37 |
| 8,523,677 B2 * | 9/2013 | Baldwin et al. | 463/42 |
| 8,535,154 B2 * | 9/2013 | Minato et al. | 463/32 |
| 8,998,715 B2 * | 4/2015 | Sitnikau | 463/31 |
| 9,086,724 B2 * | 7/2015 | Sakaguchi et al. | |
| 2001/0013868 A1 * | 8/2001 | Nishiumi et al. | 345/427 |
| 2001/0029202 A1 * | 10/2001 | Kondo et al. | 463/31 |
| 2001/0029203 A1 * | 10/2001 | Shoji et al. | 463/33 |
| 2001/0040575 A1 * | 11/2001 | Haga et al. | 345/473 |
| 2001/0040996 A1 * | 11/2001 | Ochi et al. | 382/154 |
| 2002/0034979 A1 * | 3/2002 | Yamamoto et al. | 463/31 |
| 2002/0198047 A1 * | 12/2002 | Hinami et al. | 463/32 |
| 2003/0003991 A1 * | 1/2003 | Kuraishi | 463/30 |
| 2003/0169280 A1 | 9/2003 | Hsieh | |
| 2004/0063501 A1 * | 4/2004 | Shimokawa et al. | 463/49 |
| 2004/0110560 A1 | 6/2004 | Acnuma | |
| 2004/0224760 A1 | 11/2004 | Miyamoto et al. | |
| 2004/0224761 A1 * | 11/2004 | Nishimura | 463/33 |
| 2005/0009602 A1 * | 1/2005 | Nishimura | 463/30 |
| 2005/0049047 A1 * | 3/2005 | Kitao | 463/33 |
| 2005/0107145 A1 * | 5/2005 | Karashima et al. | 463/8 |
| 2005/0239547 A1 * | 10/2005 | Haga et al. | 463/30 |
| 2006/0048073 A1 | 3/2006 | Jarrett et al. | |
| 2006/0084509 A1 | 4/2006 | Novak et al. | |
| 2006/0246968 A1 | 11/2006 | Dyke-Wells | |
| 2006/0287027 A1 * | 12/2006 | Hardisty et al. | 463/8 |
| 2007/0060336 A1 * | 3/2007 | Marks et al. | 463/30 |
| 2007/0072662 A1 * | 3/2007 | Templeman | 463/6 |
| 2007/0097150 A1 | 5/2007 | Ivashin et al. | |
| 2007/0155492 A1 | 7/2007 | Goden et al. | |
| 2007/0270215 A1 | 11/2007 | Miyamoto et al. | |
| 2007/0298881 A1 | 12/2007 | Kawamura et al. | |
| 2008/0070684 A1 * | 3/2008 | Haigh-Hutchinson | 463/32 |
| 2009/0176570 A1 * | 7/2009 | Baldwin et al. | 463/33 |
| 2009/0181736 A1 * | 7/2009 | Haigh-Hutchinson et al. | 463/2 |
| 2009/0191968 A1 * | 7/2009 | Johnson et al. | 463/37 |
| 2014/0002456 A1 * | 1/2014 | Mizuki et al. | 345/420 |
| 2014/0024452 A1 * | 1/2014 | Fujisawa et al. | 463/31 |

OTHER PUBLICATIONS

Zeleznik, Robert, et al., "UniCam—2D Gestural Camera Controls for 3D Environments," Proceedings of ACM I3D '99, 1999 Symposium on Interactive 3D Graphics, Atlanta, GA, USA, pp. 169-173 (1999).

Hinckley, K., "Input Technologies and Techniques," in Handbook of Human-Computer Interaction ed. by A. Sears & J. Jacko, pp. 1-65 (2002).

McKenna, Michael, "Interactive Viewpoint Control and Three-Dimensional Operations," Proceedings of the 1992 Symposium on Interactive 3D graphics, 1992 ACM, pp. 53-56, Association for Computing Machinery, Cambridge MA (1992).

Mohageg, Mike, et al., A User Interface for Accessing 3D Content on the World Wide Web, CHI 96 Vancouver, BC Canada, pp. 466-472 (Apr. 13-18, 1996).

Cozic, Laurent, et al., "Intuitive Interaction and Expressive Cinematography in Video Games," Theory and Practice of Computer Graphics 2004 (TPCG 2004), Birmingham, UK. IEEE Computer Society 2004, pp. 135-142 (Jun. 8-10, 2004).

MacKinlay, Jock D., et al., "Rapid Controlled Movement Through a Virtual 3D Workspace," Computer Graphics, vol. 24, No. 4, pp. 171-176 (Aug. 1990).

Non-final Office Action issued in U.S. Appl. No. 11/531,961 (Jun. 22, 2009).

Final Office Action issued in U.S. Appl. No. 11/531,961 (Mar. 5, 2010).

Advisory Action issued in U.S. Appl. No. 11/531,961 (Jun. 24, 2010).

\* cited by examiner

NON-LIMITING EXAMPLE GAME SYSTEM

NON-LIMITING EXAMPLE CONTROLLER

NON-LIMITING EXAMPLE CONTROLLER

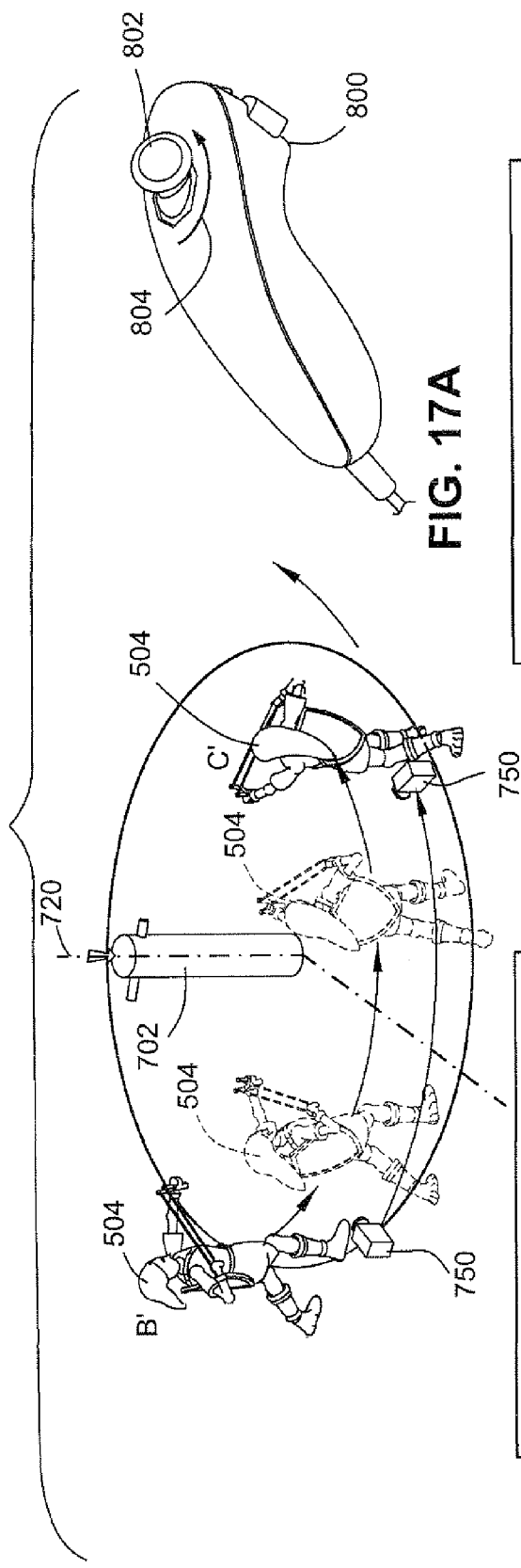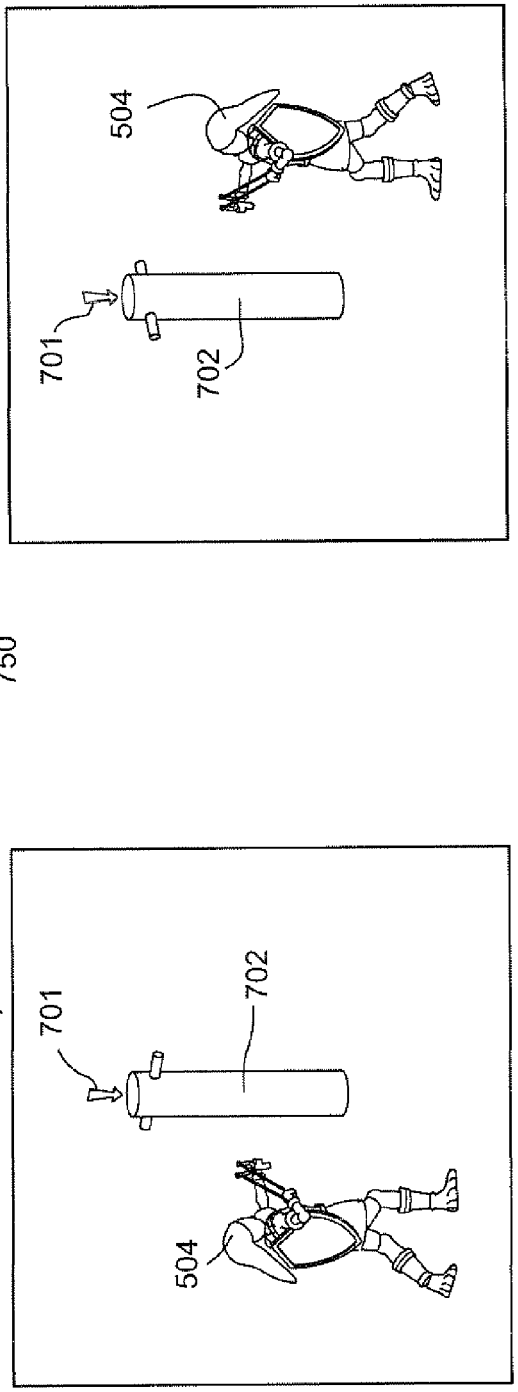
FIG. 17A
FIG. 17B
FIG. 17C

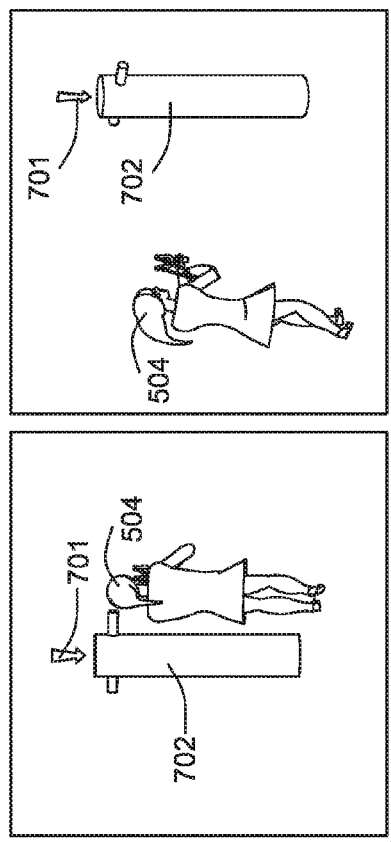
FIG. 18C
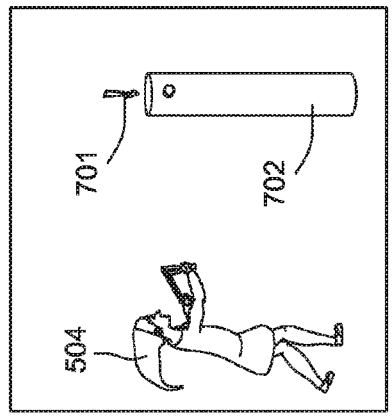
FIG. 18D
FIG. 18B
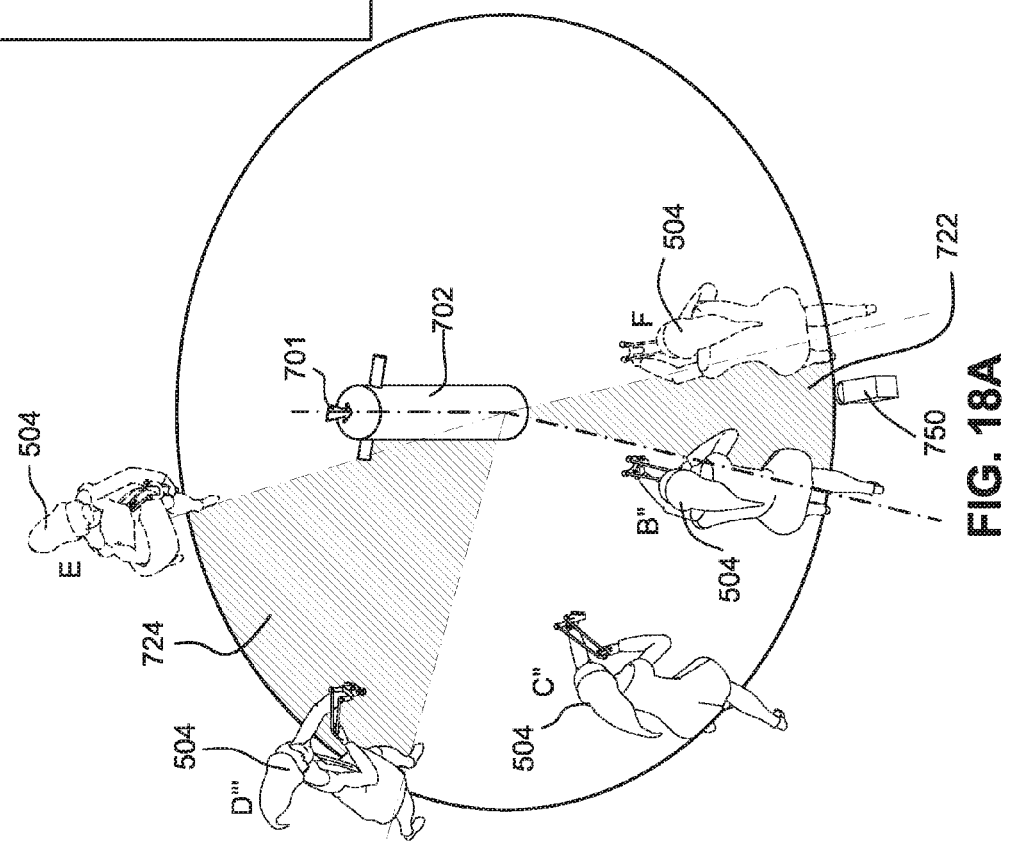
FIG. 18A

METHOD AND APPARATUS FOR ENHANCED VIRTUAL CAMERA CONTROL WITHIN 3D VIDEO GAMES OR OTHER COMPUTER GRAPHICS PRESENTATIONS PROVIDING INTELLIGENT AUTOMATIC 3D-ASSIST FOR THIRD PERSON VIEWPOINTS

CROSS-REFERENCES TO RELATED APPLICATIONS

This application claims the benefit of priority from provisional application No. 60/798,317 filed May 8, 2006, incorporated herein by reference.

TECHNOLOGICAL FIELD

The technology herein relates to interactive 3D computer graphics, and more particularly to enhanced virtual camera control within video games and other 3D computer graphics presentations.

BACKGROUND AND SUMMARY

Anyone who has ever tried using a camcorder or other portable movie camera knows how challenging it can be to get just the right camera angle and field of view. Trying to film action on a soccer or baseball field presents a number of technical difficulties. Where to stand with the camera, the amount of zoom to employ, the direction to aim the camera, whether to keep the view finder trained on a competitor or at a wider angle to capture action, and other technical issues make the filming endeavor fairly complicated.

Television producers of professional and college sports broadcasts solve these problems by providing many different cameras and switching between the cameras as needed to provide many different viewpoints. Some of the cameras may be located way up in the stands and have very powerful zooming capabilities. Other cameras may be located down on the field to capture the action at field level. Using many different cameras can ensure that no important action is missed.

Cinematographers use even more advanced techniques to capture action for motion pictures. A number of different cameras from many different viewpoints are often used. However, the resulting sequence of scenes that the moviegoer eventually sees is typically the product of extensive editing of the footage captured by all of those different cameras. Cinematographers have the luxury of being able to extensively edit a movie during production. For example, in showing a conversation between an actor and an actress, it is not unusual to have one camera trained on the actor and another camera trained on the actress. One sees the actor from the viewpoint of the actress and vice versa. The same scene is captured several different times from several different viewpoints—and extensive post-filming editing is used to properly sequence all of the image segments.

Some prior 2D games showed all of the action from a distant, fixed viewpoint. Zooming, panning and scrolling were in many cases provided. Nevertheless, the user's basic viewpoint was generally limited to a third-person perspective surveying the entire scene. The introduction of 3D computer graphics to mass market home and arcade video game play allowed video game developers to come closer than ever before to photorealism. Many animated video games now appear so real as to be almost movie like. One innovation introduced with 3D video game play was to use a "virtual camera" within the 3D video game scene to capture desired points of view.

With the introduction of 3D computer graphics technology, it became possible to more flexibly define the viewpoint at any arbitrary position within the 3D world. A changeable 3D viewpoint was something that had been used and explored for many years in 3D computer graphics. In the context of interactive video games, however, modeling of a "virtual camera" within the 3D world itself gave the user great flexibility in terms of visualizing the 3D scene.

In some 3D games, the game player was given the ability to control the position, aiming direction, amount of zoom and/or other virtual camera parameters by for example operating joysticks and/or pushbuttons. This gave the game player the ability to look around the 3D scene, zoom in on distant objects, etc. In some games, this was like handing the game player a camcorder—the game player now had a lot of flexibility, but with that flexibility came additional complexity.

Another type of 3D game called the "first person" game also become popular. In such "first person" games, the video game developer located the camera at the same position within the 3D world as the main animated character's eyes. The video game player thus felt as if he or she was experiencing the 3D world from the same perspective as the game character moving through the 3D world. Some games provided an ability to switch between a first person view and a third person view. First person games can provide a lot of excitement, but "first person" perspectives are not always desirable in every context. Some game play benefits from a "third person" perspective.

While much work has been done in the past in connection with virtual camera control for 3D video game and other interactive computer graphics, further improvements are possible and desirable.

While giving a video game player complete freedom and flexibility in specifying the position, direction and zoom of a virtual camera may sound appealing, some video game players find such added complexity actually detracts from the video game experience. For example, it may be desirable in certain video game and other computer graphics presentations to provide a degree of automatic virtual camera control that simulates what one might see when watching a movie or other cinema graphics presentation of the same action of other events. Intelligent, automatic virtual camera control can allow the video game player to focus on other aspects of game play important to the game play action (e.g., aiming and firing a weapon, maneuvering a watercraft or motor vehicle, running while avoiding a series of obstacles and the like).

The technology herein provides improvements in virtual camera control within a 3D video game or other computer graphics interactive presentation. In one exemplary illustrative non-limiting implementation, the user interactively moves a targeting mark within a 3D world. An animated game character automatically responds to the targeting mark. For example, in one exemplary illustrative non-limiting implementation, an animated game character trains a weapon such as a bow and arrow on the targeting mark and turns and pivots so as to always face the targeting mark. For example, as the game player moves the targeting mark, the animated game character automatically changes the aim of this weapon to follow the targeting mark.

In one exemplary illustrative non-limiting implementation, a virtual camera within the 3D scene may also respond to the targeting mark. For example, the virtual camera can change its field of view (aim up, aim down, zoom in or out if desired, etc.) based on the targeting mark's relative position. However, in one exemplary illustrative non-limiting implementation, the virtual camera may also shift or pivot its position or viewpoint within the 3D world based on the user-placed targeting mark's relative position. For example, the virtual camera can automatically shift its position so that whenever the targeting mark is positioned to the right of the animated game character relative to a reference, the virtual camera looks over the character's right shoulder; and whenever the targeting mark is positioned to the left of the animated game character relative to a reference, the virtual camera looks over the animated character's left shoulder.

In one exemplary illustrative non-limiting implementation, the virtual camera captures the 3D scene from a "third person" viewpoint. In one example implementation, the third person virtual camera may be positioned behind the animated game character so that the scene is viewed over the animated game character's shoulder. In one exemplary illustrative non-limiting implementation, when the game player moves the targeting marker such that the action might be best viewed from another virtual camera position, the virtual camera is automatically pivoted with respect to the animated game character's position so that for example, the scene is now being viewed by looking over the animated game character's other shoulder.

In a further exemplary illustrative non-limiting implementation, the virtual camera remains relatively fixed while the player moves the character around a target. In this exemplary implementation, the character is "locked-on" to the target, so that no matter where the player moves the character, the character remains facing the target and the character's weapon remains facing the target. In this exemplary implementation, as long as the character doesn't attempt to move behind an obstacle (such that the view of the character from the camera would be obstructed) then the camera substantially remains in an original position, from where it was initially looking over a character's shoulder. As the character starts to move behind the target, however, the camera may begin to rotate with the character. Just before the character would pass behind the target (thus obscuring him from view) the camera may begin to rotate around the target in the direction of the character's movement, thereby always keeping the character and the target in view. According to this implementation, it may also be possible to maneuver the character such that it actually does pass behind the target. To avoid the character being obscured by the target for more than a brief moment, if such maneuvering does happen, the camera may immediately switch to a second perspective, such that the character is now shown from the target's other side, having just passed behind it.

In one exemplary illustrative non-limiting implementation, the virtual camera may act as if it is tethered on an invisible tether to the centroid of the game character. The user-controller targeting marker's position relative to the animated game character's centroid is used to determine where the virtual camera is positioned along the arc traced by the invisible tether. In one exemplary illustrative non-limiting implementation, for example, the virtual camera may have two alternative positions—one looking over the animated game character's right shoulder, and the other looking over the animated game character's left shoulder. Which of these two virtual camera positions is automatically selected may depend for example on the user-controlled targeting marker's relative position relative to the animated game character's position and the virtual camera's position. This may also be determined, for example, based on the targeting marker's relative position relative to the character alone.

In one exemplary illustrative non-limiting implementation, an imaginary plane passing through the game character's centroid to the center of the scene and/or the center of the virtual camera's field of view may be used to determine which virtual camera viewpoint to use. If the targeting marker is on the right-hand side of the virtual plane, then the virtual camera position is set to view the scene over the animated game character's right shoulder. If the game player moves the targeting marker to the left of the imaginary plane, then the virtual camera position is pivoted automatically so the scene is now viewed from the perspective of looking over the animated game character's left shoulder. In this way, the virtual camera position captures all of the action (e.g., both the animated game character movements and those of the targets or other parts of the 3D world character is interacting with), without the game player having to worry about the animated game character obstructing the game player's view and without requiring a so-called "first person" viewpoint. Using such an interesting third-person viewpoint, the game player does not necessarily feel as if he or she "is" the animated game character, but is nevertheless able to flexibly control the animated game character's actions while watching everything that is going on in the 3D world and not having to worry unduly about controlling the direction the virtual camera is aiming.

Other exemplary illustrative non-limiting implementations can automatically select between different virtual camera viewpoints depending on a variety of factors including for example the absolute or relative position of a targeting marker, the orientation and actions of the animated game character or characters, additional user inputs and controls, and other factors.

In an additional exemplary illustrative non-limiting implementation, the player may control the game character to "lock on" to a particular target. Once the user selects the particular target by "locking on" to that target, the animated game character may attack or otherwise interact with that target. Virtual camera position can be determined based upon which character has been locked on to, the action developing in the 3D scene, and other factors.

Thus, in one particular implementation, a pivoting camera viewpoint is provided so that when an animated game character uses a bow and arrow or other weapon, the camera adopts a third person 3D view based on the game character's relative position and the target at which the game character is aiming his bow. The user positions a target cursor on the desired target. This causes an imaginary line segment to be drawn in 3D space between the desired target and the game character (or possibly the game character's bow). The imaginary line segment continues through and past the game character. The camera is anchored to the other end of the line segment. This means that the camera is always viewing the target, and the game character is always between the camera and the target. The effect is to pivot the camera around the game character as the user moves the target cursor.

In another exemplary illustrative non-limiting implementation, there are a plurality of targeting modes. In a first "free targeting" mode, the character's position is fixed in either a left or right hand corner of the screen, and the player can freely move the targeting marker around the screen. If the character is in the left corner, the camera looks over the character's right shoulder, and if the character is in the right corner, the camera looks over the character's left shoulder. This generally prevents the character from obstructing the scene, while also showing a third person view including the character. In this exemplary implementation, the player can use a second directional control (other than the one controlling the targeting marker) to move the shown scene around, allowing the character to effectively "spin" in place or look up and down (although the character does not actually change position).

In this exemplary implementation, the character's initial position in the targeting mode, i.e., lower left or lower right corner, is determined based on a position of a cursor prior to entering the mode. According to this exemplary implementation, a moveable cursor is provided within the scene containing the character. If the cursor is to the character's right when the "free targeting" mode is selected, then the character is shifted to the lower left corner and initially aims a weapon to the right. If the cursor is to the character's left when the "free targeting" mode is selected, then the character is shifted to the lower right corner and initially aims a weapon to the left.

The other targeting mode according to this exemplary implementation is a "lock on" mode, wherein a character can move freely but is locked on to a particular target. In this mode, according to this exemplary implementation, the character can roam a full 360° around a target and remains facing the target the entire time. Thus, if a player desires to have a character flank a target to attack a vulnerable spot, for example, the player can lock on to the target and maneuver the character to allow the character to attack from behind. Since the character remains facing the target, the player can instantly attack as soon as the character is in the appropriate position.

According to this exemplary lock on mode implementation, the character is initially shown from a perspective over its left or right shoulder, with the target being shown to the side of the character corresponding to the shoulder being initially looked over (e.g. if the scene is initially shown over the character's right shoulder, the target will be on the right side of the character). If the player maneuvers the character such that the character passes between the camera and the target, then, according to this implementation, the camera view will switch to show a perspective over the character's opposite shoulder, with the target on the character's other side.

In another exemplary target lock on implementation, the game player has control over which individual character or object to "lock on" to in defining an attack.

BRIEF DESCRIPTION OF THE DRAWINGS

These and other features and advantages will be better and more completely understood by referring to the following detailed of exemplary illustrative non-limiting implementations in conjunction with the drawings, of which:

FIGS. 17A-C show an additional series of exemplary views of a game character in game space when moving around a target in a lock-on mode;

FIGS. 18A-D show exemplary camera self-adjustment when a character moves into areas in which a view of the character might be blocked.

DETAILED DESCRIPTION

Figure 1:
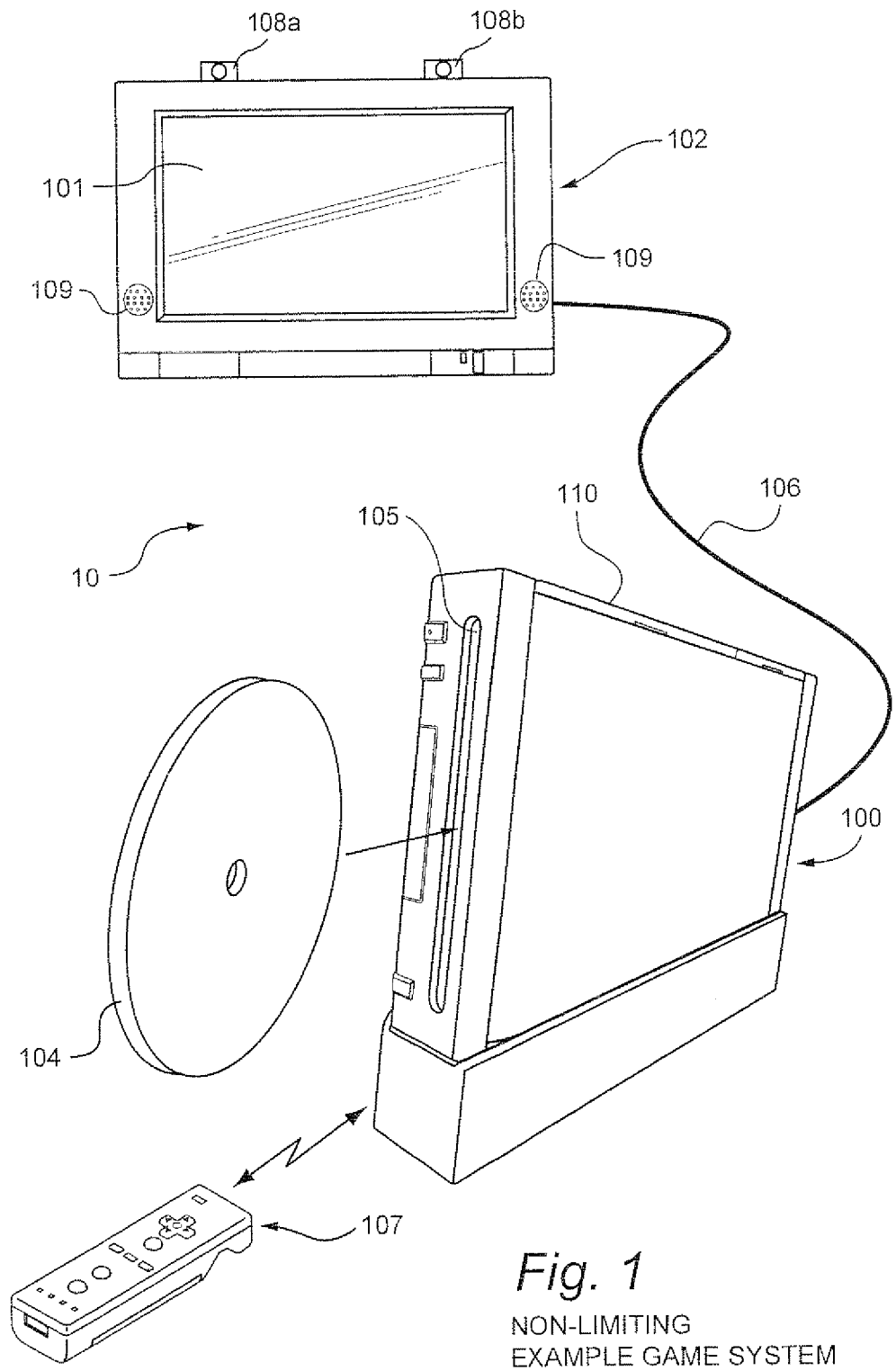
FIG. 1 is a diagram of an example illustrative non-limiting game system.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display 101 of television 102 to which game console 100 is connected by cable 106. Audio associated with the game program or other application is output via speakers 109 of television 102. While an optical disk is shown in FIG. 1, the game program or other application may alternatively or additionally be stored on other storage media such as semiconductor memories, magneto-optical memories, magnetic memories and the like.

Controller 107 wirelessly transmits data such as game control data to the game console 100. The game control data may be generated using an operation section of controller 107 having, for example, a plurality of operation buttons, a direction key and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Although markers 108a and 108b are shown in FIG. 1 as being above television 102, they may also be positioned in other locations, such as below television 102. In one implementation, a center point between light-emitting devices 108a and 108b is substantially aligned with a vertical centerline of television 102. The images from light-emitting devices 108a and 108b can be used to determine a direction in which controller 107 is pointing as well as a distance of controller 107 from display 101. By way of example without limitation, light-emitting devices 108a and 108b may be implemented as two LED modules (hereinafter, referred to as "markers") provided in the vicinity of a display screen of television 102. The markers each output infrared light and the imaging information calculation section of controller 107 detects the light output from the LED modules to determine a direction in which controller 107 is pointing and a distance of controller 107 from display 101 as mentioned above. As will become apparent from the description below, various implementations of the system and method for simulating the striking of an object described herein do not require use such markers.

Figure 2:
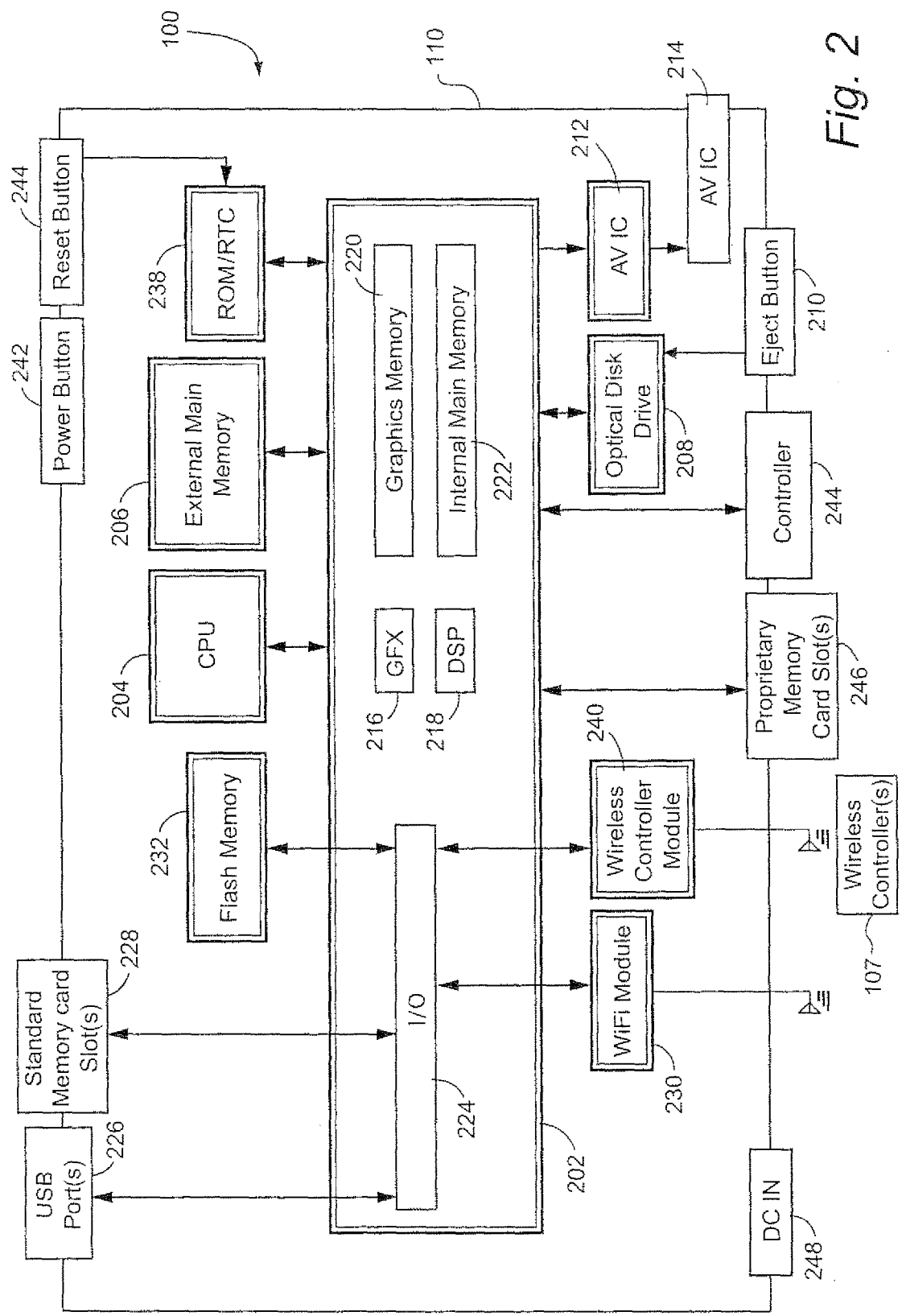
FIG. 2 is a block diagram of example game system shown in FIG. 1.

With reference to the block diagram of FIG. 2, game console 100 includes a RISC central processing unit (CPU) 204 for executing various types of applications including (but not limited to) video game programs. CPU 204 executes a boot program stored in a boot ROM (not shown) to initialize game console 100 and then executes an application (or applications) stored on optical disc 104, which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed to take advantage of the capabilities of CPU 204 and graphics processor 216 and optical disks of a second type (e.g., of a second size and/or a second data structure) containing applications originally developed for execution by a CPU and/or graphics processor having capabilities different than those of CPU 204 and/or graphics processor 216. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (I/O) processor 224.

I/O processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module may also be used for communication with other game devices such as suitably-equipped hand-held game devices. Module 230 is referred to herein as "WiFi", which is generally a designation used in connection with the family of IEEE 802.11 specifications. However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to I/O processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected to controller 107 and controller 107 can transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, connectors 244 may be connected to respective wireless receivers that receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 244 is used to reset (re-boot) game console 100.

Figure 3A:
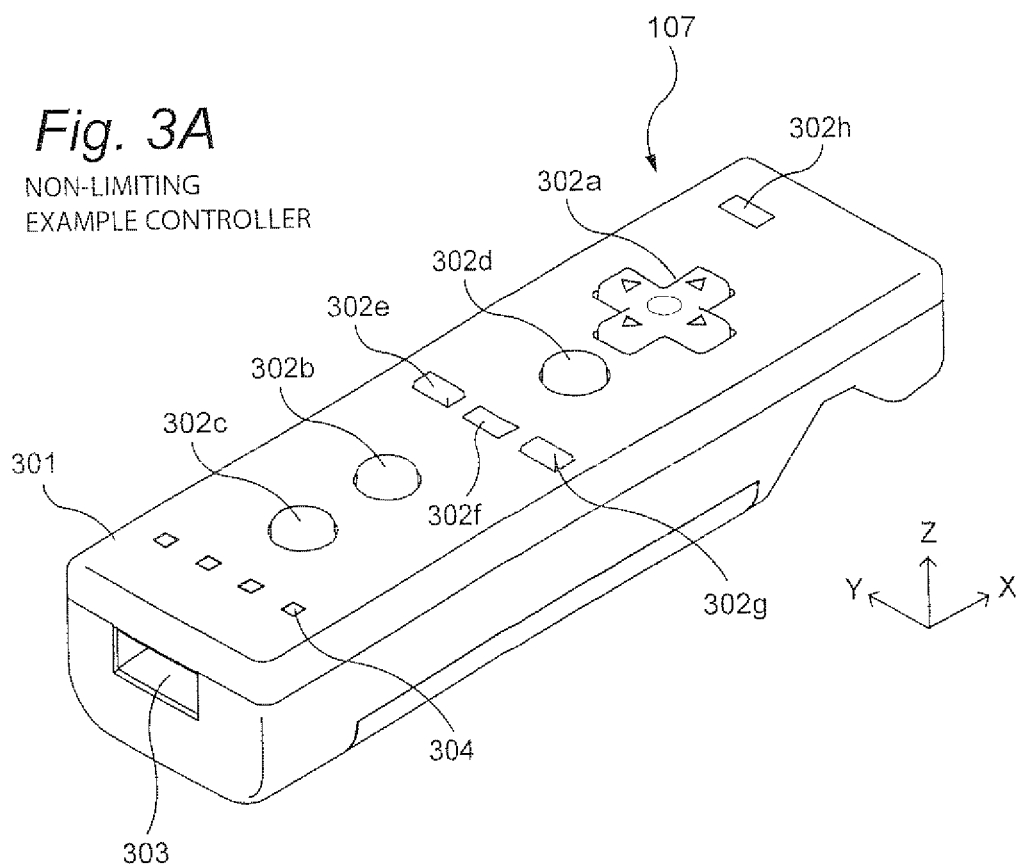
FIGS. 3A and 3B are perspective views of a top and a bottom of example controller shown in FIG. 1.
Figure 3B:
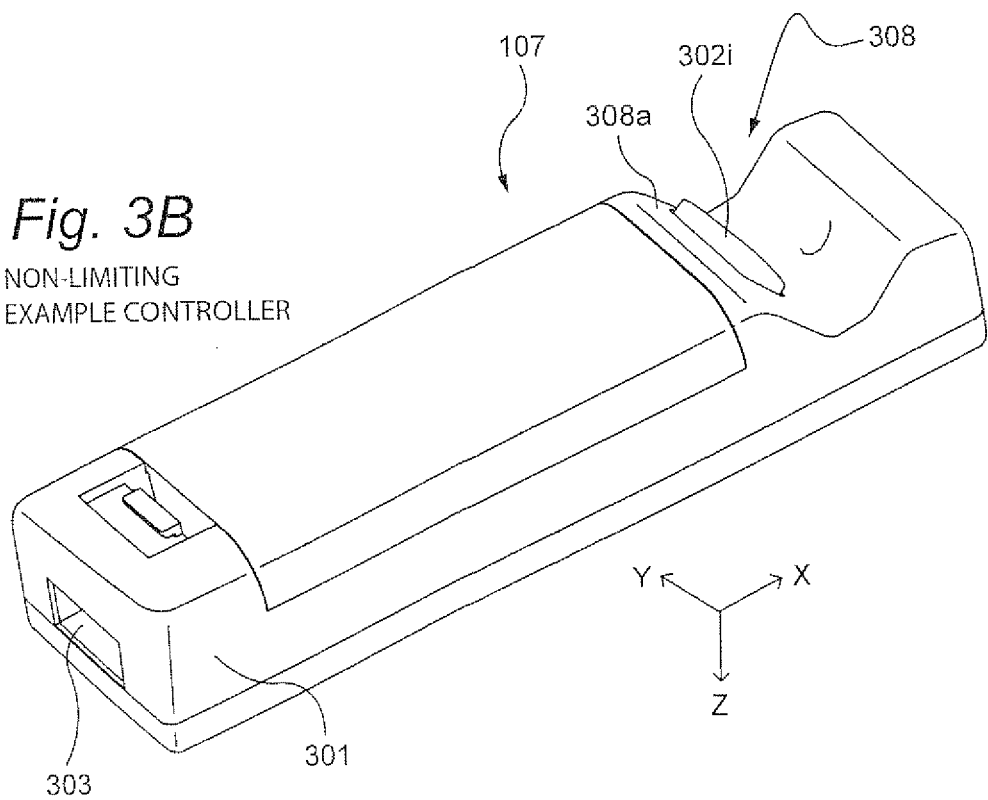
Figure 4:
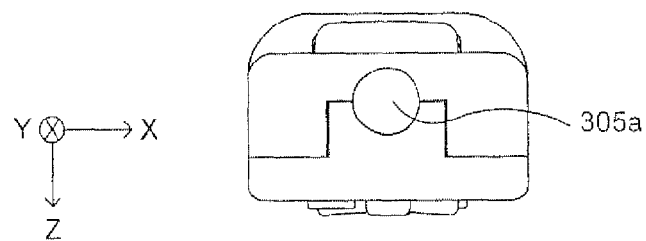
FIG. 4 is a front view of example controller shown in FIG. 1.

With reference to FIGS. 3 and 4, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player can be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively a "1" button, a "2" button and an "A" button and buttons 302e through 302g are respectively a "+" key, a menu switch, and a "−" key, for example. Generally, buttons 302b through 302g are assigned various functions in accordance with the application being executed by game console 100. In an exemplary arrangement shown in FIG. 3, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as a "B" button which can be used, by way of illustration, as a trigger switch in a shooting game.

As shown in FIG. 4, an imaging element 305a is provided on a front surface of controller housing 301. Imaging element 305a is part of an imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. The techniques described herein of simulating the striking of an object can be achieved without using information from imaging information calculation section 305, and thus further detailed description of the operation of this section is omitted. Additional details may be found in Application No. 60/716,937, entitled "VIDEO GAME SYSTEM WITH WIRELESS MODULAR HANDHELD CONTROLLER," filed on Sep. 15, 2005; 60/732,648, entitled "INFORMATION PROCESSING PROGRAM," filed on Nov. 3, 2005; and application No. 60/732,649, entitled "INFORMATION PROCESSING SYSTEM AND PROGRAM THEREFOR," filed on Nov. 3, 2005. The entire contents of each of these applications are expressly incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5:
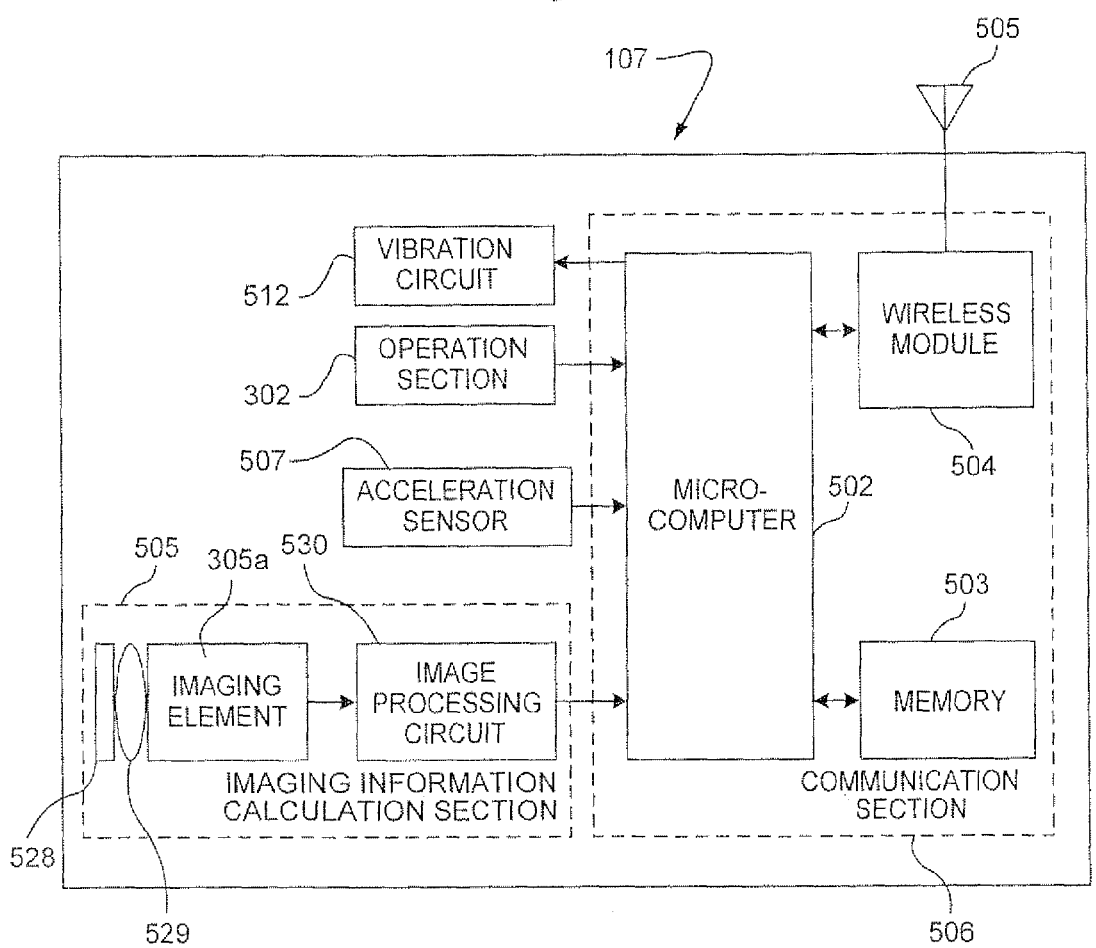
FIG. 5 is a block diagram of example controller shown in FIG. 1.

As shown in the block diagram of FIG. 5, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis may be used or a one-axis linear accelerometer that only detects linear acceleration along the Z-axis may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 307 is subjected to dynamic accelerations by, for example, the hand of a user, as will be explained in detail below.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5, image information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 309. Accordingly, imaging element 305a captures images of only the infrared light that has passed through infrared filter 528 and generates image data based thereon. This image data is processed by image processing circuit 520 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

Vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player grasping controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at predetermined time intervals. Because game processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth (registered trademark) technology, controller 107 can also receive data wirelessly transmitted thereto from devices including game console 100.

Example Virtual Camera Control

Figure 6:
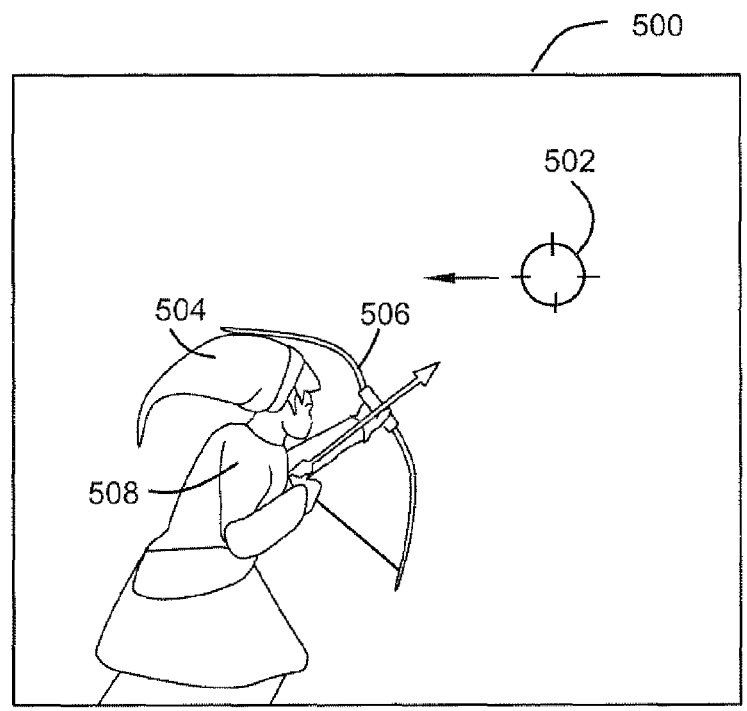
FIGS. 6, 7, 8, 9, 10 & 11 show a sequence of example non-limiting illustrative scenes produced by the FIG. 1 system under program control to provide an intelligent third person 3D virtual camera position assist.

FIGS. 6, 7, 8, 9, 10 and 11 show one example illustrative non-limiting implementation of how a virtual camera can be automatically controlled to provide different third person perspectives based on for example the position of a targeting marker 502. Referring to FIG. 6, a 3D image 500 of the type to be displayed on a television screen, liquid crystal display, or any other display as described above is shown. This 3D image 500 may show a rich and varied 3D landscape including buildings, animated characters, mountains, castles, or any other desired objects with shading, texture mapping and other rich complexity. In the example shown, for purposes of simplification of illustration and explanation, however, all that is shown in image 500 is a targeting marker 502 and an animated game character 504 holding on to a weapon 506 (in this case a bow and arrow).

In this particular example, the game player provides inputs to the video game system to control the position of targeting marker 502. The game player may control the position of targeting marker 502 by any convenient means such as by tilting handheld controller as described above, moving a joystick, moving a stylus in contact with a touch screen, or any other convenient method. As the game player moves targeting marker 502, the video game system automatically animates character 504 so that the character turns toward the targeting marker and the character's weapon 506 is always pointing toward the targeting marker. In this way, the game player selects where animated game character 504 is aiming his weapon 506.

For example, if the game player positions targeting marker 502 directly above a displayed enemy (not shown) within a 3D scene, then animated character 504 is controlled to automatically aim his weapon 506 at the targeting marker and thus at the enemy. In this exemplary illustrative non-limiting implementation, targeting marker 502 is displayed as if it were positioned on a virtual reticle or other 2D overlay in front of the entire scene. However, in other exemplary illustrative non-limiting implementations, the targeting marker 502 could be a laser pointer, a tracer bullet, or any other indicator within the 3D scene itself.

Figure 6A:
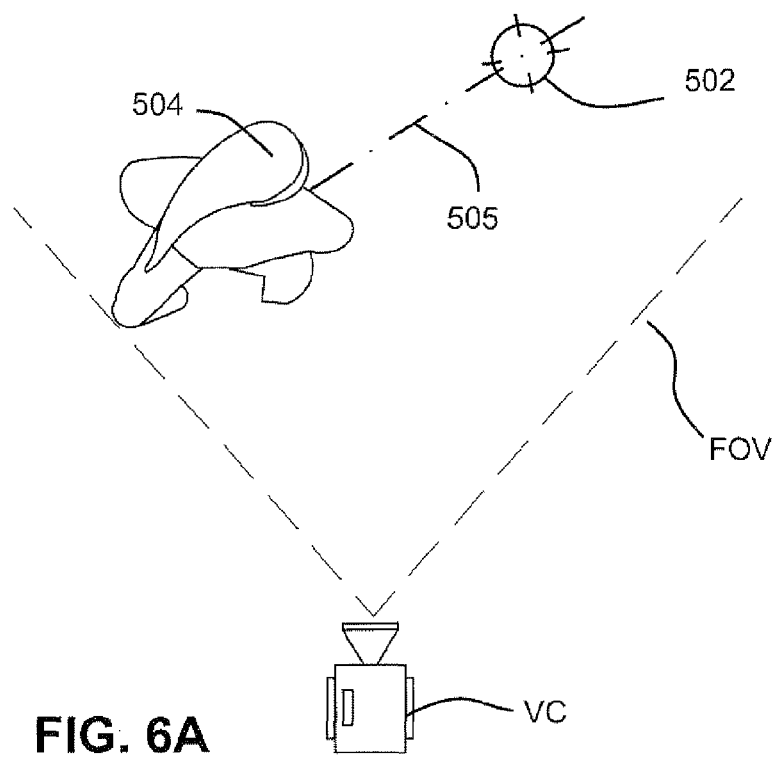
FIGS. 6A, 7A, 8A, 9A, 10A & 11A show a sequence of schematic illustrations of virtual camera placement corresponding to FIGS. 6, 7, 8, 9, 10 & 11, respectively.

Image 500 is "captured" from the perspective of a virtual camera VC also located within the same 3D world as character 504. See FIG. 6A. In the FIG. 6 example shown, the virtual camera is surveying the 3D scene as if the camera is looking over the right shoulder 508 of animated character 504. In this particular instance, the aiming direction for the animated game character 504 may actually be indicated by a vector drawn from the virtual camera VC through the targeting marker 502 toward infinity within the 3D scene. Alternatively, as another example, the aiming direction can be indicated by a vector 505 drawn through the centroid of the character and passing through the targeting marker. Wherever the game player positions targeting marker 504 within the 3D scene is the place that game character 504 automatically aims his weapon 506. The game player may actuate the weapon 506 (e.g., by pressing or releasing a button, pulling or releasing a trigger or joystick or the like) to animate game character 504 to fire the weapon 506 (in this case, letting an arrow fly toward the enemy marked by targeting marker 502).

Figure 7:
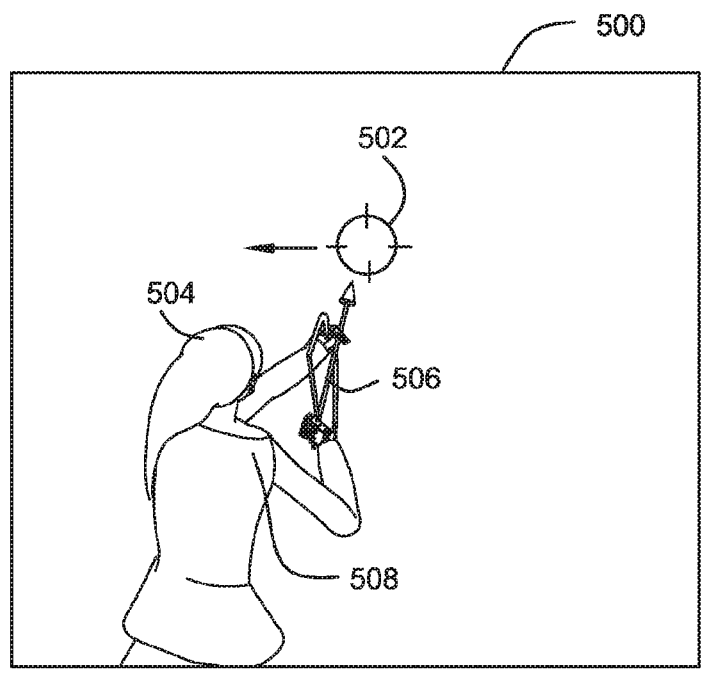
Figure 7A:
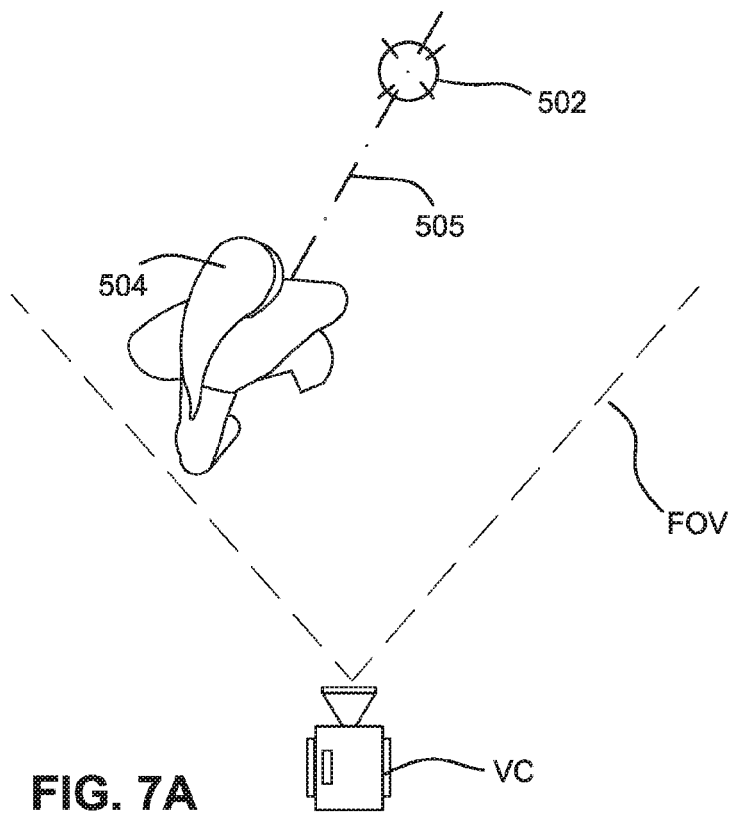

FIG. 7 shows another exemplary image 500 after the game player has used inputs to move the targeting marker 502 to the left. In this case, the virtual camera VC is still positioned to view the 3D scene over the animated game character's right shoulder 508, the weapon 506 continues to be aimed at (and follows) the targeting marker 502, and the animated game character 504 is automatically animated to turn slightly to the left in order to change his aim so that weapon 506 is directed at the targeting marker. See FIG. 7A. The character's aim, in one exemplary implementation, follows a vector 505 from the centroid of the character through the targeting marker.

Figure 8:
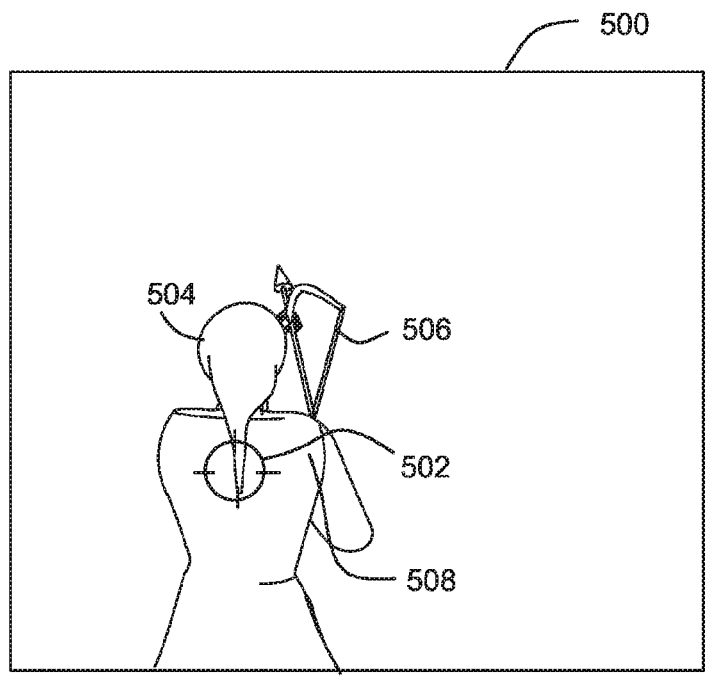
Figure 8A:
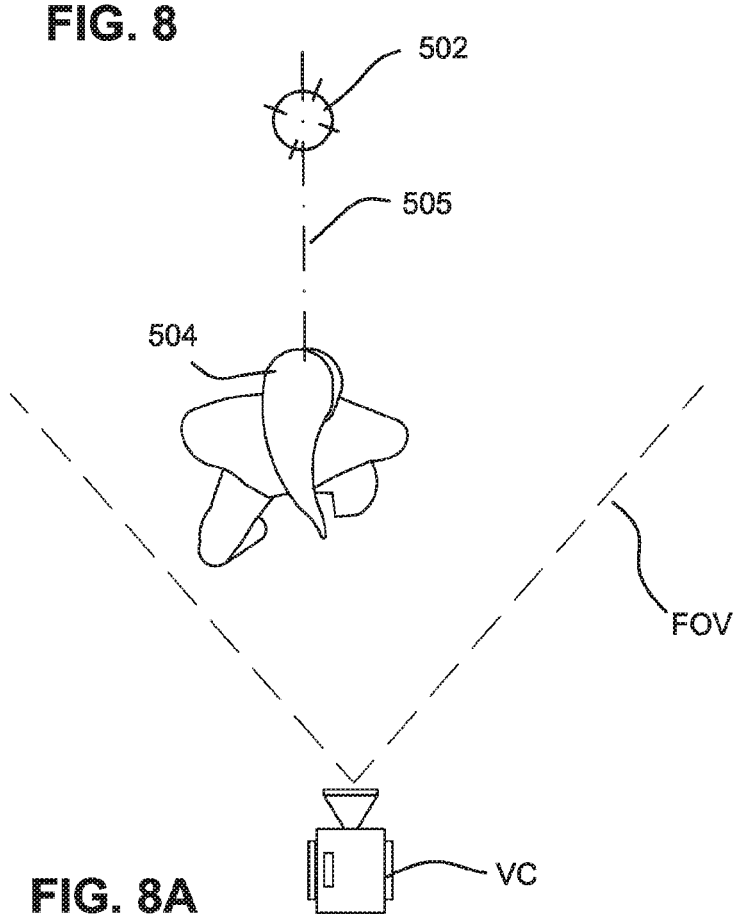

FIG. 8 shows the 3D image as the game player continues to move the targeting marker 502 leftward in the scene. In this particular instance, the targeting marker 502 is now aimed directly in front of animated character 504. In other words, the game player desires the animated game character 504 to aim his weapon 506 directly in front of him—and the animated game character 504 is now positioned between the game player's virtual viewpoint (from the perspective of the virtual camera) and the desired target the game player has indicated by the targeting marker 502. Note that the virtual camera's perspective remains the same—the game player continues to look into the 3D scene over the animated character's right shoulder 508. See FIG. 8A.

In this particular exemplary illustrative non-limiting implementation, the targeting marker 502 is shown positioned "on" the game character 504 itself so that that game player does not lose sight of the targeting marker 502. As discussed above, however, other arrangements are possible.

Figure 9:
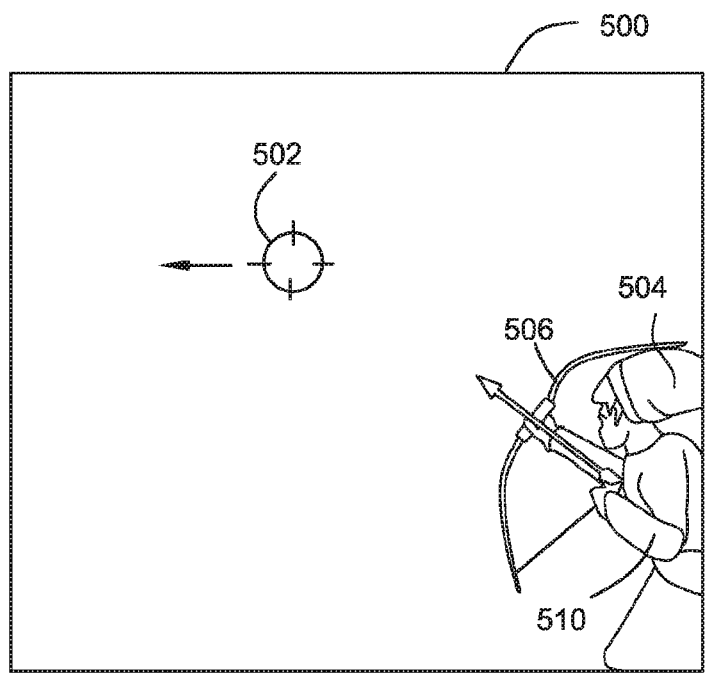
Figure 9A:
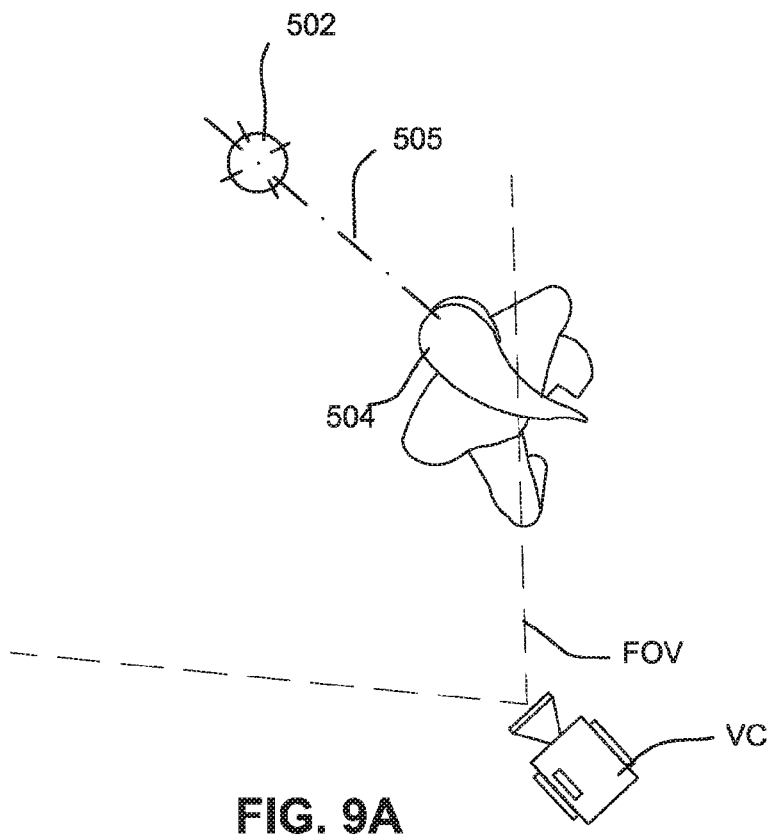

FIG. 9 shows an example view as the game player continues to move targeting marker leftward to "cross" the game character 504 and come to rest at a position that is now to the left of the animated game character 504 within the 3D scene. In this particular example, as the targeting marker 502 crosses an imaginary plane extending through and in a direction toward the "front" of the game character 504 (e.g., relative to the current virtual camera position), the position of the virtual camera and/or its viewing direction or field of view shifts rapidly. FIG. 9, 9A shows that the virtual camera VC has moved in position and/or direction relative to the FIG. 8, 8A position. Note that the virtual position of game character 504 within the 3D world has not changed between FIG. 8 and FIG. 9—all that the animated game character has done is to pivot or rotate to the left in order to follow the targeting marker 502. However, the game play shown provides a different virtual camera position as the targeting marker has moved from the right to the left "crossing" the game character 504 relative to the virtual camera's field of view—so that the game player now feels as if he is watching the 3D scene from a position standing to the animated game character's left-hand side and looking over the character's left shoulder 510.

In one exemplary illustrative non-limiting implementation, a virtual invisible plane may be defined between the virtual camera VC and the centroid of the game character 504. As the targeting marker 502 passes through that virtual plane, the virtual camera VC changes position by moving and/or pivoting to the left so that it is now viewing the 3D scene over the game character's left shoulder 510. In one exemplary illustrative non-limiting implementation, the transition between the FIG. 8 viewpoint and the FIG. 9 viewpoint can be very rapid. The effect is similar to a cinematography effect where the camera has pivoted or swung very rapidly to give the viewer has the best viewpoint of the action. The rapid pivoting of the virtual camera is not distracting but actually feels very natural from the game player's perspective since the average game player has been exposed to rapid shifts in camera angle based on viewing modern action films.

In an alternative exemplary illustrative non-limiting implementation, the camera location and the on-screen character position are fixed when the character is in this free-targeting mode (i.e. the player can move the targeting marker wherever desired). In this exemplary implementation, the character 504 is fixed in a lower left or right hand corner (e.g. one of the positions shown in FIGS. 6-11). No matter where the player aims the targeting marker 502, the character's location will not change. The character 504 may move a weapon 506 to continue to aim at the targeting marker 502, but the character 504 itself does not change location. If, for example, the character is positioned as in FIG. 8, then moving the targeting marker to the far left of the screen will not produce the scene shown in FIG. 9. Rather, the targeting marker will simply be positioned to the far left of the screen, visible above the character's shoulders or imposed on the character itself, depending on targeting marker vertical positioning.

According to this implementation, if the player wishes to view a different portion of the world to select a target, the player uses a control other than that controlling the targeting marker (e.g. an analog joystick) to turn the direction in which the character faces. This allows the character to spin a full 360 degrees although the entire time the camera remains over the character's right shoulder (in this example).

In both of these exemplary implementations, the character continues to aim along a vector 505 passing through the character's 504 centroid and through the targeting marker 502.

Figure 10:
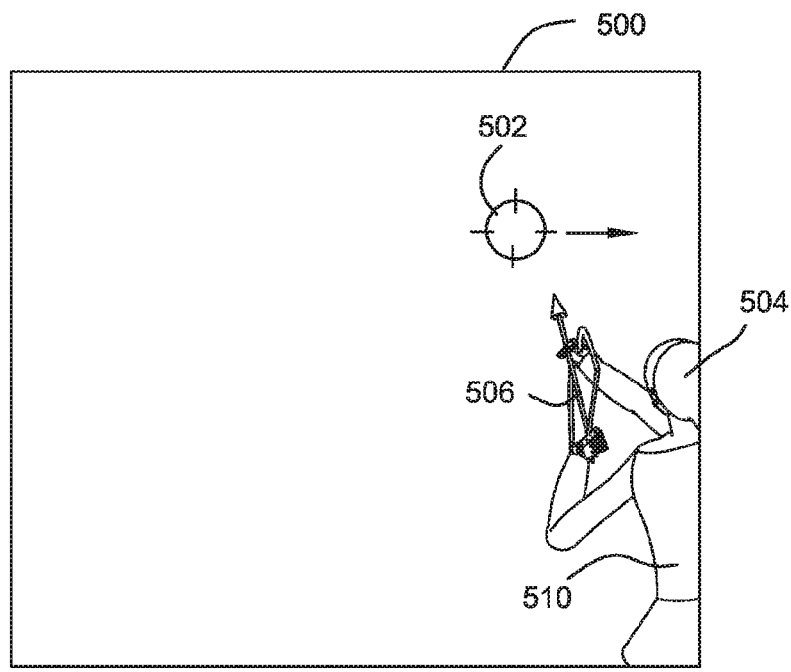

FIG. 10 shows an example image 500 in which the game player has moved the targeting marker 502 slightly to the right relative to its FIG. 9 position in order to change the direction animated game character 504 is aiming his weapon 506. In the exemplary illustrative non-limiting implementation, the game player may move targeting marker 502 over a wide range within the 3D scene. As long as he does not cross the position of the game character with the targeting marker, the virtual camera position will remain the same (although the virtual camera may still change other parameters such as azimuth and/or inclination to always keep the targeting marker and the associated target within view). In some exemplary illustrative non-limiting implementations, the direction in which the virtual camera is aiming may also change to follow the targeting marker 502 so that, depending on virtual zoom and other factors, the targeting marker (and thus the object the animated game character's weapon 506 is aimed at) always remains within the virtual camera's field of view.

Figure 10A:
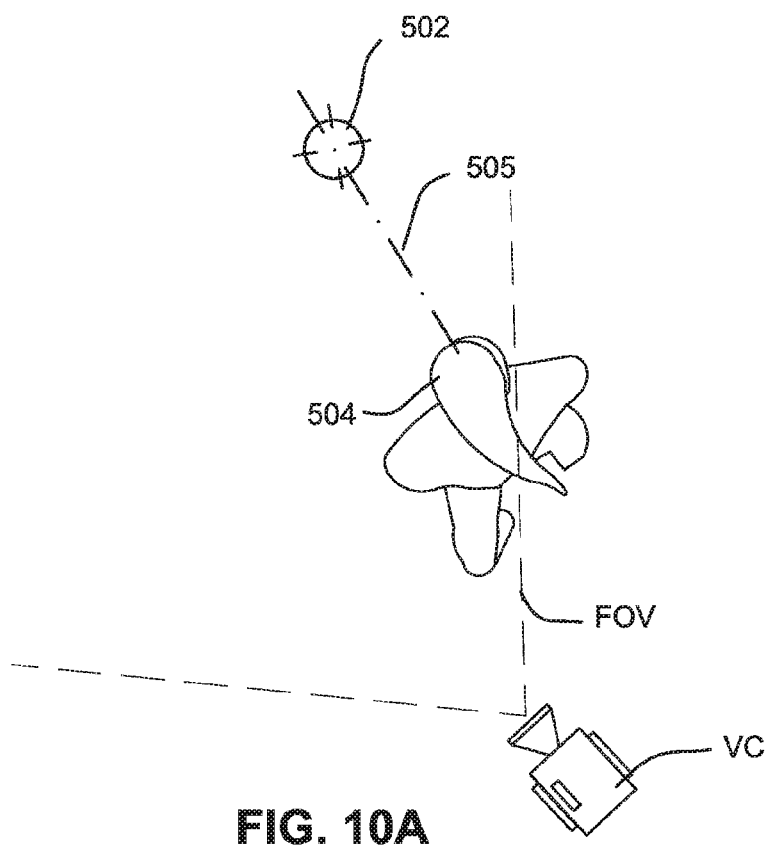
Figure 11:
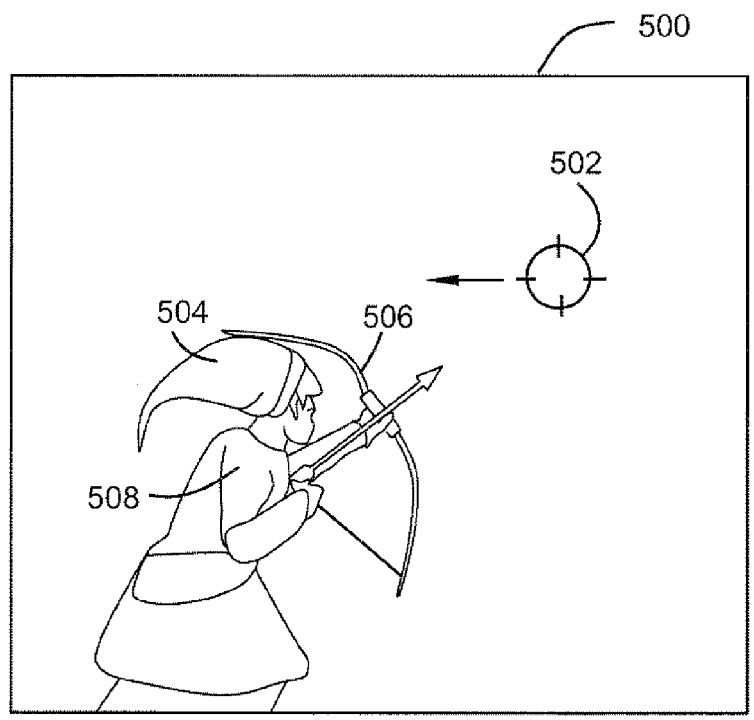
Figure 11A:
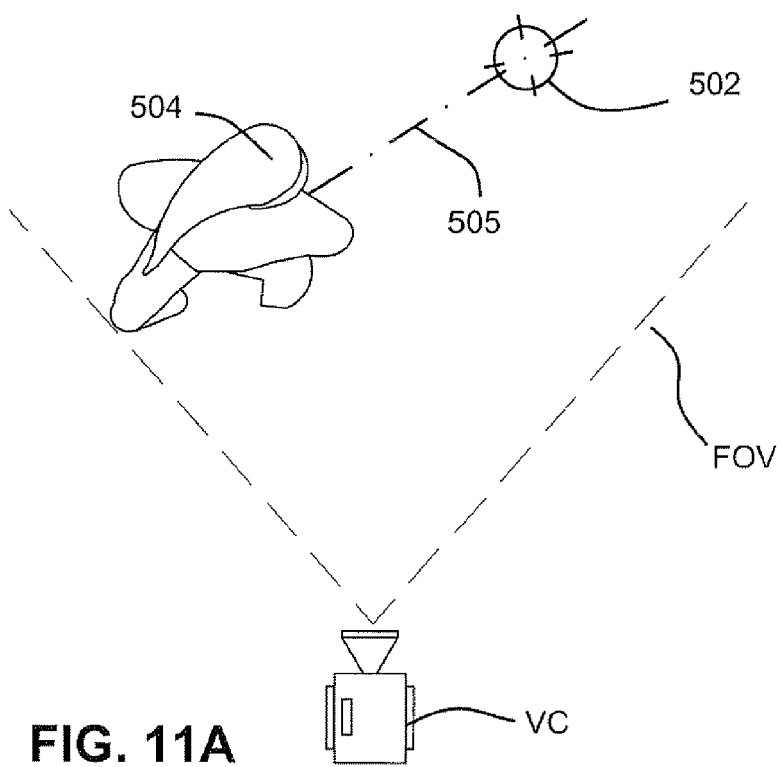

As the game player continues to move the targeting marker 502 rightward, the targeting marker will eventually cross the line between the virtual camera position and the centroid of the virtual character 504. At this point, the virtual camera position automatically shifts again so the game player feels as if he is again viewing the 3D scene over the game character's right shoulder 508 rather than his left shoulder. This is shown in the transition between FIGS. 10 and 11 (see also FIGS. 10A and 11A).

FIGS. 12A-12D show exemplary illustrative non-limiting displays of a character shifting from a "movement" mode to a "free targeting" mode. According to these exemplary implementations, a player controlled cursor 760 is shown flying in a position on the screen. In this exemplary implementation, the position of the cursor 760 can be changed using the same control that the player would use to move the targeting marker in the free targeting mode. Thus, for example, the player could preposition the targeting marker in the movement mode before switching into the free targeting mode.

Figure 12A:
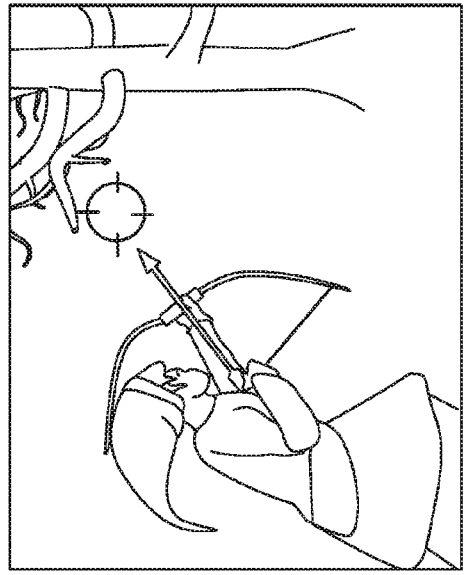
FIGS. 12A-D show a series of exemplary views showing various positions of a camera when a character is in free targeting mode.
Figure 12B:
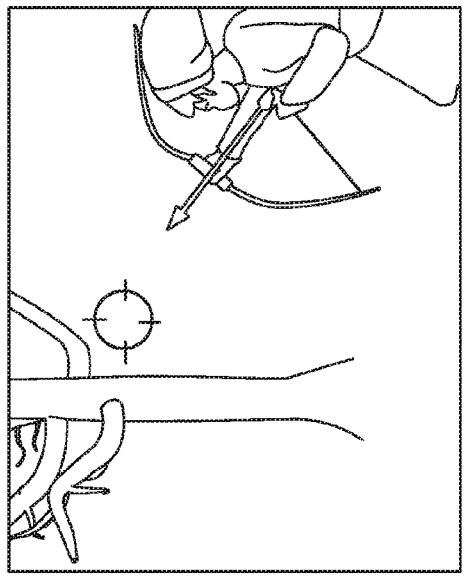
Figure 12C:
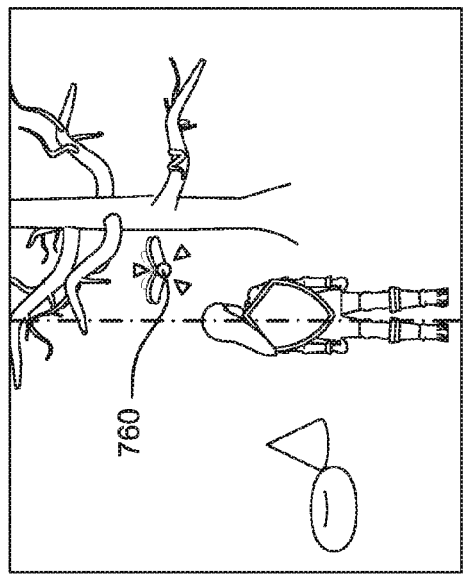
Figure 12D:
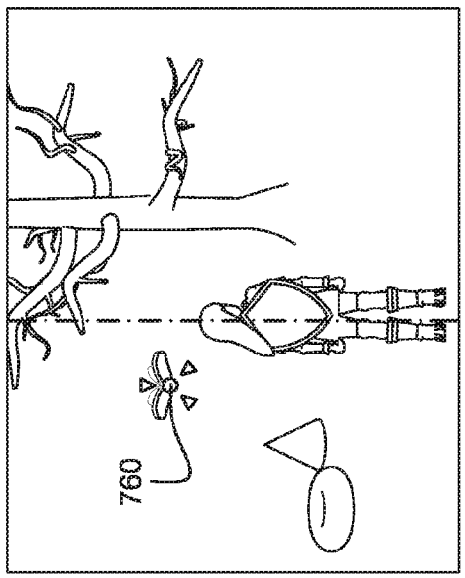

FIGS. 12A and 12C are the same exemplary displays, except that the cursor 760 has moved from the character's right side in 12A to the character's left side in 12C. According to this exemplary implementation, the relative position of the cursor to the character when the targeting mode is selected determines at which screen side the character is positioned. The FIG. 12A displayed scene changes to the FIG. 12B displayed scene once a free targeting mode is activated, since the cursor is on the character's right side. Similarly, the FIG. 12C scene becomes the FIG. 12D scene once a free targeting mode is activated, since the cursor is on the character's left side. In either FIG. 12B or 12D, the character has not actually moved positions, rather the player is shown the scene over the character's shoulder that was on the same side as the cursor.

In this exemplary implementation, such a system allows the player to "pre-designate" which side of the screen the character will be set to, as well as which side of the screen will be shown, all through the use of a single input in the exemplary illustrative non-limiting implementation. For example, if two enemies are charging the player, from the left and from the right, but the right-most enemy is closer, the player can position the cursor over the closer enemy and trigger the free targeting mode. Since the perspective will shift so the character is placed in the lower left corner, the player has a clearer view of a wider area of the right half of the previous movement mode screen. The player can then target the closer enemy, kill it, shift back to movement mode, place the cursor over the remaining enemy and trigger the free targeting mode again.

Since in this exemplary implementation, the free targeting mode is triggered by the same button, regardless of the resultant character position, the player can worry less about designating the proper input to place a camera in one position or another and focus more on playing the game. The action becomes very intuitive. The player simply places the cursor over what he wishes to attack in movement mode, triggers free targeting mode, and the camera is automatically placed in a proper position allowing optimal view of the approaching designated target or designated area.

Figure 13:
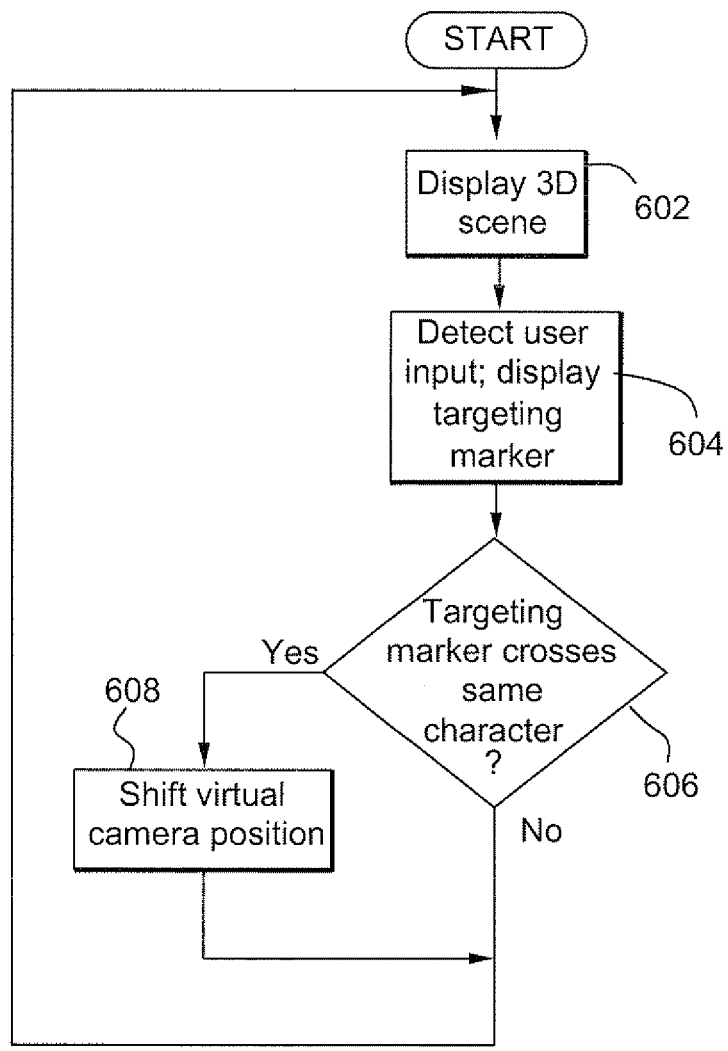
FIG. 13 is an example flowchart for camera decision making.

FIG. 13 shows an example flowchart of program control steps used by the FIG. 1 system to generate scenes wherein a targeting marker passing from a character's first side to second side causes a shift in displayed character position (i.e. the character display is swapped from one camera to another and the character moves from a lower first corner to a lower second corner). In this particular illustrative non-limiting example, the 3D scene is displayed from a particular virtual camera position and then user input is detected (blocks 602, 604). The targeting marker 502 is displayed as a position corresponding to user input (block 604). The system then detects whether the targeting marker crosses the game character (e.g., by performing a plane test as discussed above, or by any other means) (decision block 606). If the test reveals that the targeting marker has "crossed" the game character ("yes" exit to decision block 606), then the position and/or direction and/or other parameter associated with the virtual camera VC is shifted or pivoted (block 608) and the scene is redisplayed from the new viewpoint (block 602). This process continues for the duration of game play.

Figure 14:
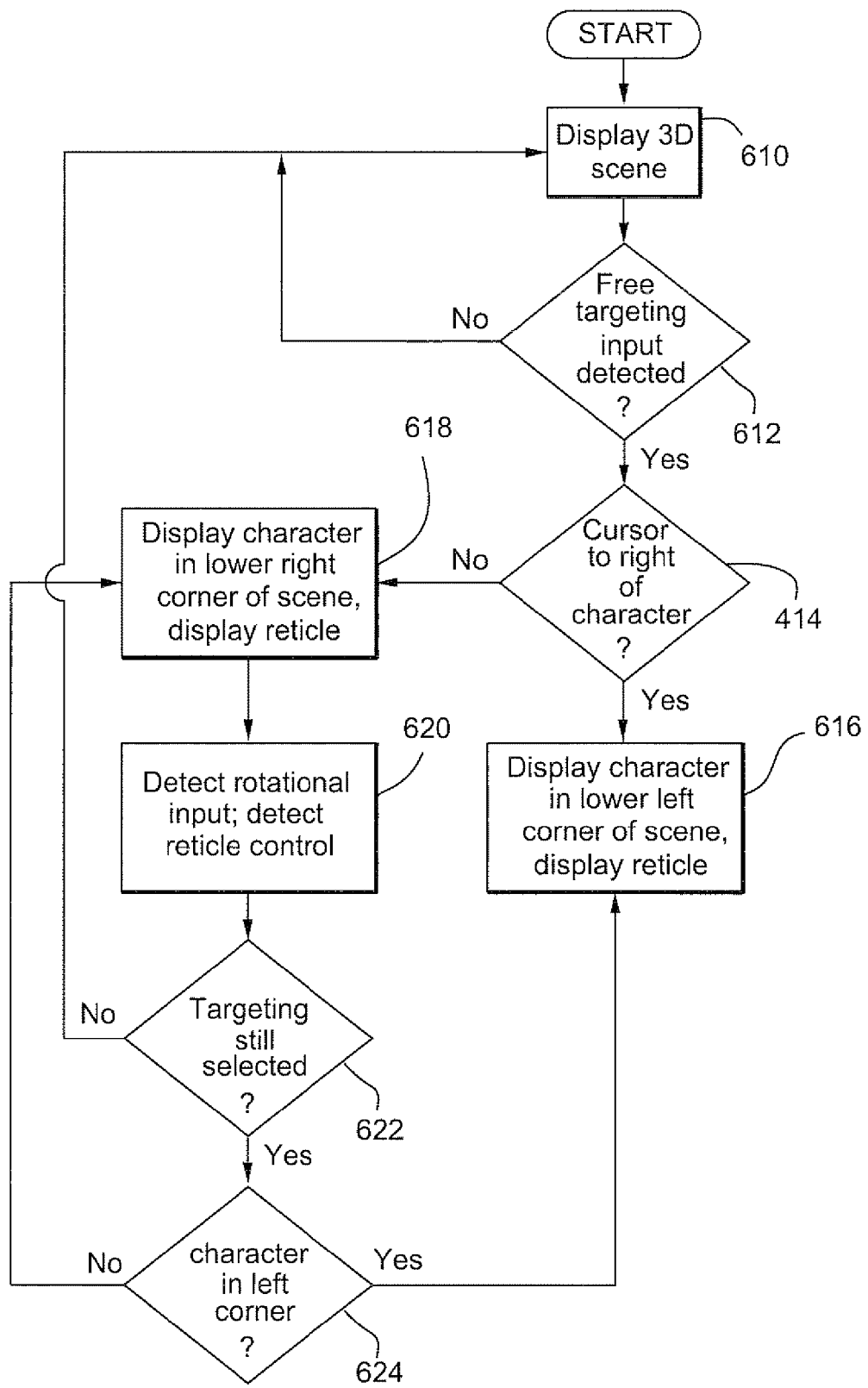
FIG. 14 shows another example flow chart for camera decision making.

FIG. 14 shows an example flowchart of program control steps used by the FIG. 1 system to generate scenes wherein a player is first displayed in a movement mode and then subsequently switches into a free targeting mode. According to this exemplary illustrative non-limiting implementation, a 3D scene is displayed showing the character free to move about in the game world (block 610). The system then detects whether a user has indicated a desire to switch into a free targeting mode (decision block 612). If so, the system must determine whether the character is to be rendered in a lower left or lower right corner (at least according to this example, although other positions could be available).

To determine which corner the character is rendered in, the system detects whether the displayed cursor is to the right of the character or not (decision block 614). While it would also be possible to subsequently determine if the cursor was to the left of the character or not, in this example it is assumed that if the cursor is not to the right of the character, then it must be to the left of the character. If the cursor is to the right of the character, the character is displayed in a lower left screen corner (block 616). Alternatively, if the cursor is not to the character's right, the character is displayed in a lower right screen corner (block 618). From either display, rotational input and/or targeting marker control are detected (block 620). Additionally, the system checks to ensure that targeting is still desired (decision block 622). If targeting is no longer selected at some point, then the system can return to display the character in a movement mode. As long as targeting is still selected, however, the system checks to see whether the character is in a lower left corner (decision block 624) and then branches to block 616 or 618 depending on the result, allowing a new check for different input.

Figure 15:
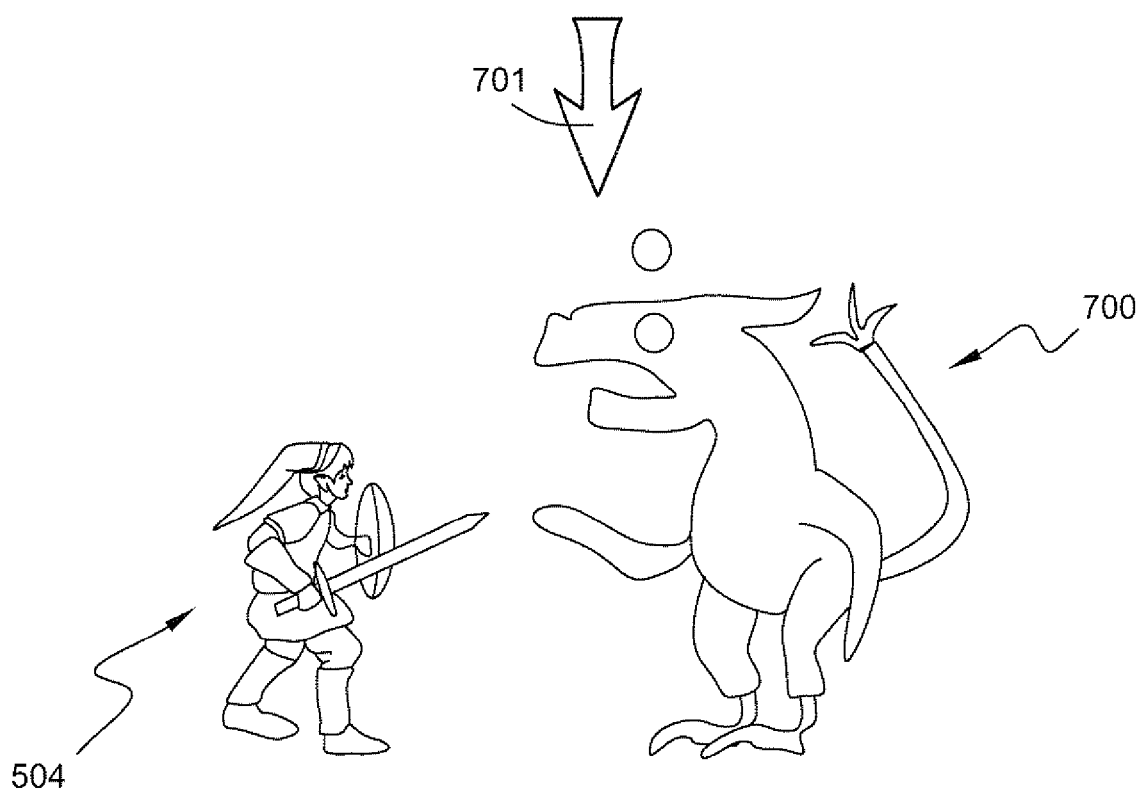
FIG. 15 shows an example lock-on targeting mechanism.

FIG. 15 shows another exemplary illustrative non-limiting example of game play effects in which the game player can designate an enemy or object to attack or otherwise interact with by moving a targeting marker or other indicator to a particular enemy or other object and then providing a control input that causes the game to "lock on" to that particular target 700. The animated game character 504 may now attack the target 700 (e.g., by directing a sword fight toward it, or shooting it with a selected missile weapon). In this way, the game player can select between a number of different enemies or other objects for the game player 504 to attack, and the game animation automatically animates the game character 504 to attack the target the game player has "locked on" to. Note that "locking on" may not necessarily be in the sense of defining a field of view that aims or focuses on the "locked on" target. For example, such "locking on" can in some exemplary illustrative non-limiting implementations simply designate a particular object that the game character 504 is to attack. A third person (or other) viewpoint can then be used to observe the attack.

FIGS. 16A-16D show a plurality of exemplary third person viewpoints when a game is in a lock-on targeting mode according to an exemplary illustrative non-limiting implementation.

Figure 16A:
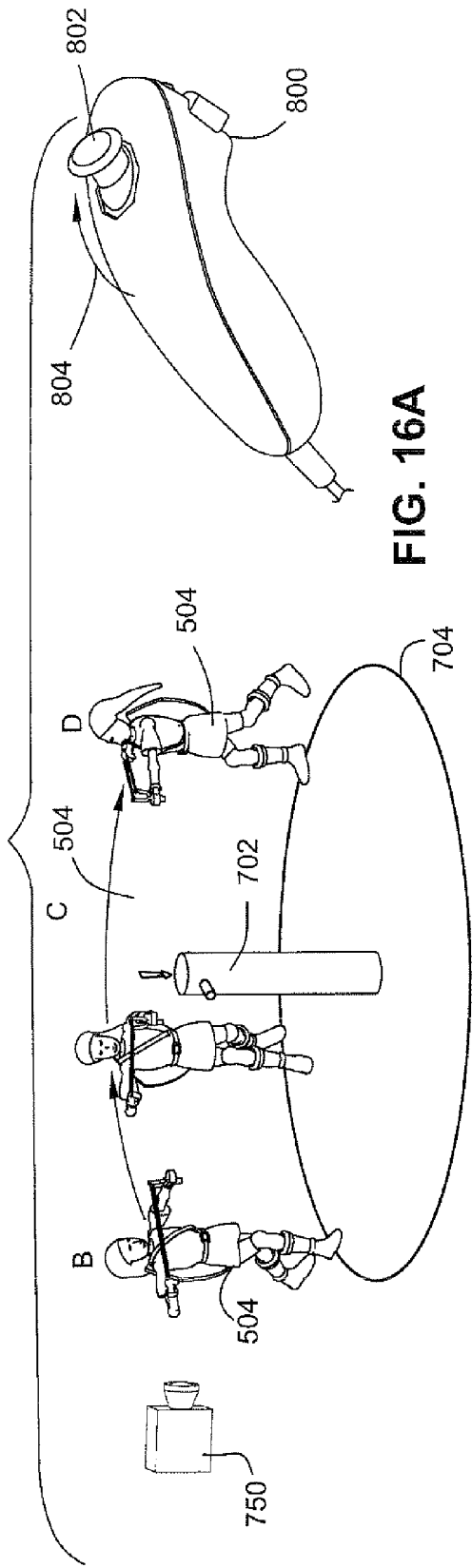
FIGS. 16A-D show a series of exemplary views of a game character in game space when moving around a target in a lock-on mode.

FIG. 16A shows an overhead view not necessarily seen in the game in this exemplary implementation but described here for purposes of illustration and clarity. A character 504 is displayed at a variety of positions B, C and D around a target dummy 702. According to this exemplary implementation, once the character 504 has locked-on to the target 702, the character can be freely moved within the game space. Here, the character is shown rotating from a position B where the camera 504 is looking over the character's right shoulder to a position C 90° away, to a position D almost 180° away. At each position B, C and D, the character 504 remains facing the target 702 and the character's weapon is aimed at the target along a vector (not shown) from the character's centroid through the target. While no targeting marker is provided according to this exemplary implementation, a marker 701 indicating the selected target may be shown, allowing the player to easily determine which target is locked in.

Figure 16B:
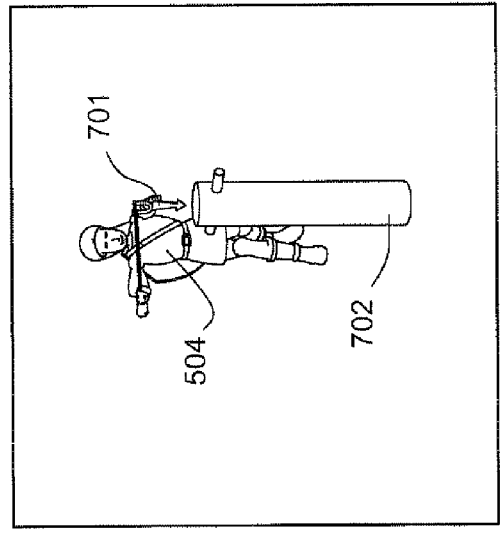

FIG. 16B shows an exemplary screen that might be shown if the character 504 is in position B. Here, the character is shown to the left and in the foreground with respect to the target 702. The marker 701 indicating target selection may also be shown.

Figure 16C:
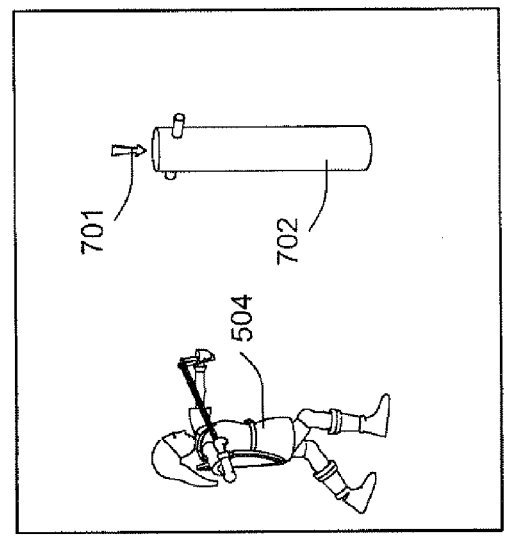

FIG. 16C shows a second exemplary screen that might be shown if the character has moved to position C. Returning to FIG. 16A, an exemplary control 800 for moving the character is shown. Analog joystick 802 can be moved freely to cause the character to move in a corresponding direction. In this exemplary implementation, the joystick has been rotated along the arrow 804, indicating a desire to have the character perform a similar rotation about the target 702. In FIG. 16C, the character has moved approximately half-way to position D, although the camera position remains relatively unchanged. The character and the target are both shown approximately equidistant from the camera, in this implementation. While the camera may pan in or out to keep both the character and the target shown on the screen, the camera remains generally stationary until the character reaches position D.

Figure 16D:
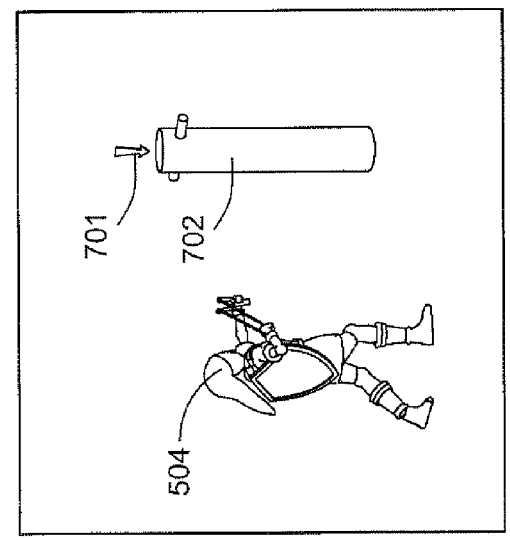
Figure 19A:
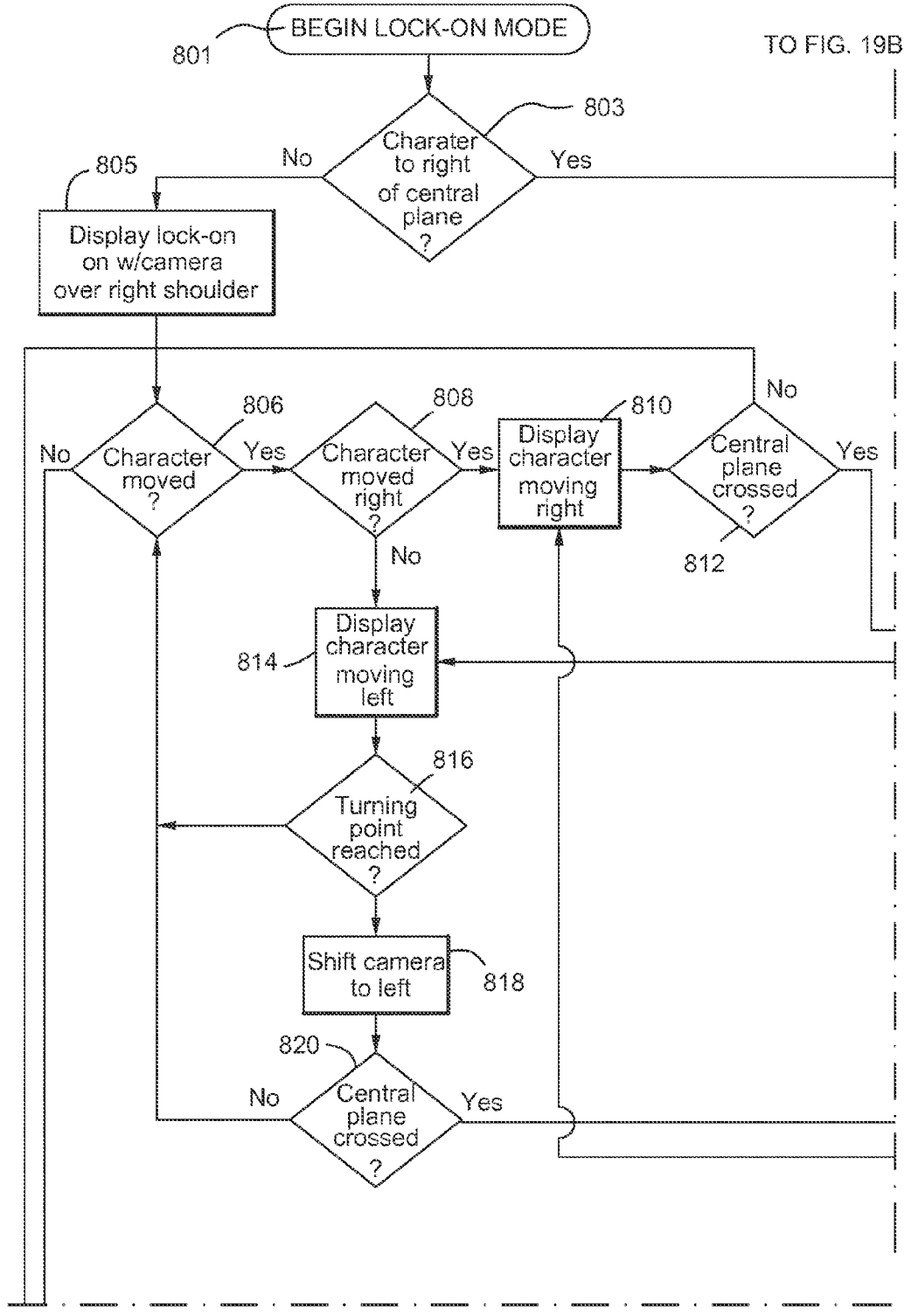
FIGS. 19A-19D together shows an exemplary decision flow for various camera self-controls.
Figure 19B:
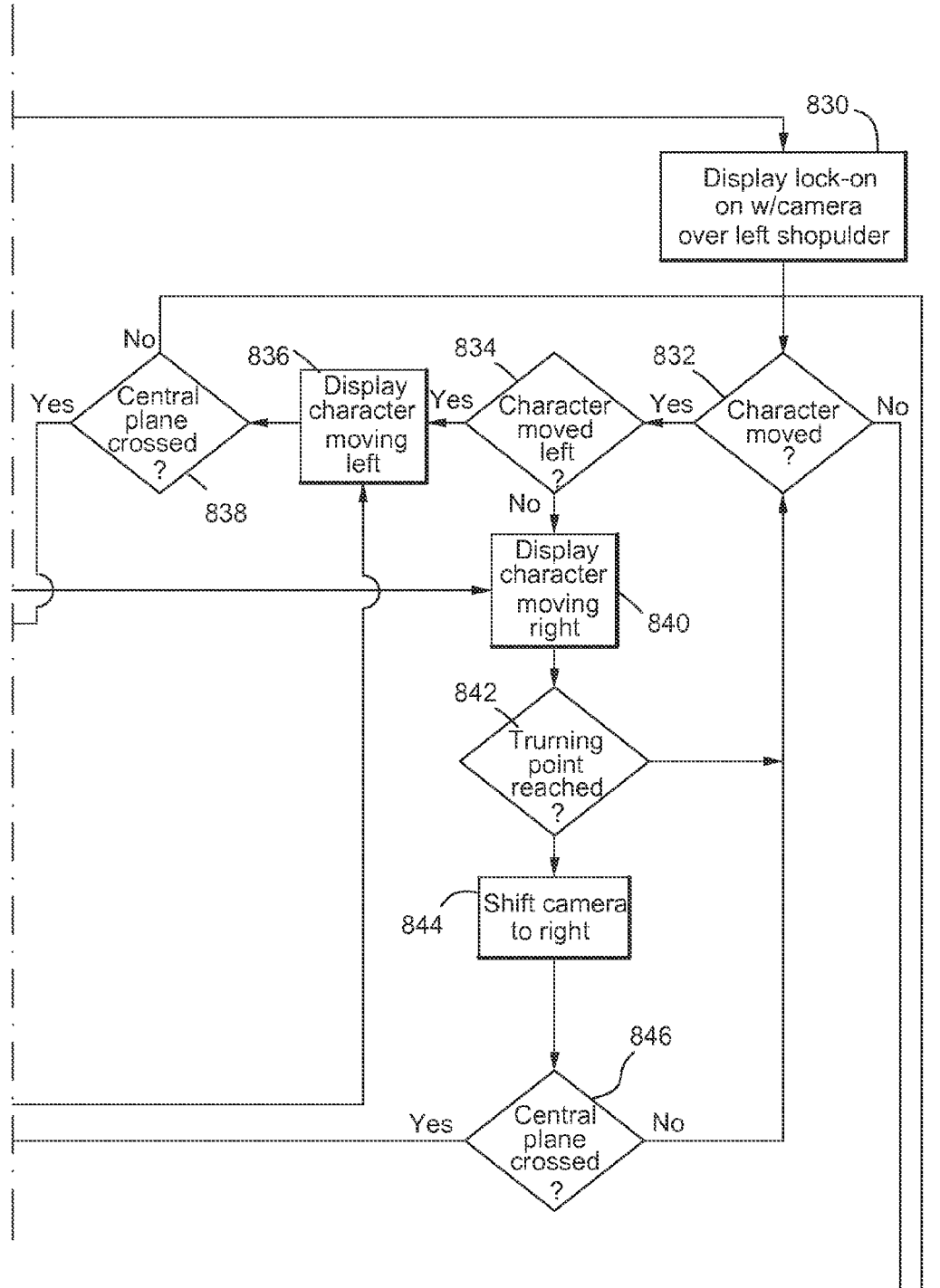
Figure 19C:
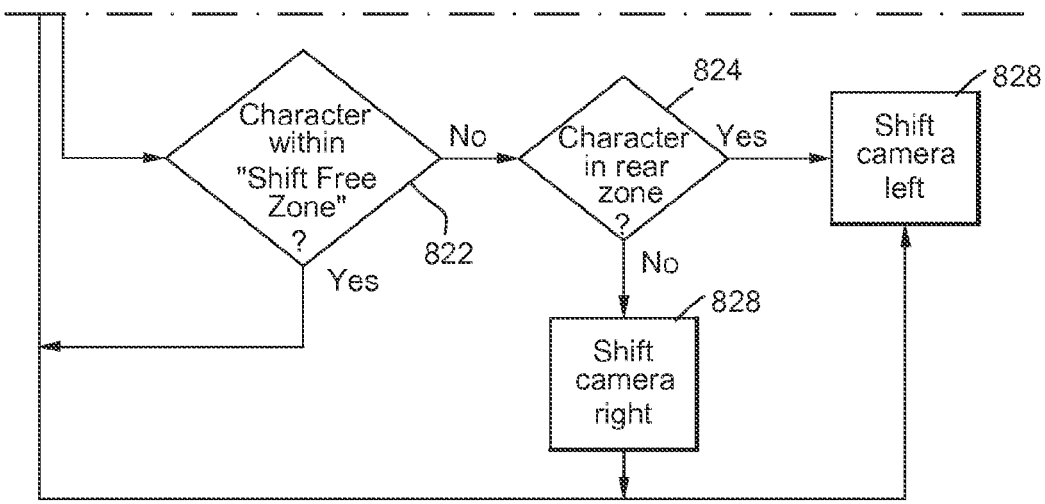
Figure 19D:
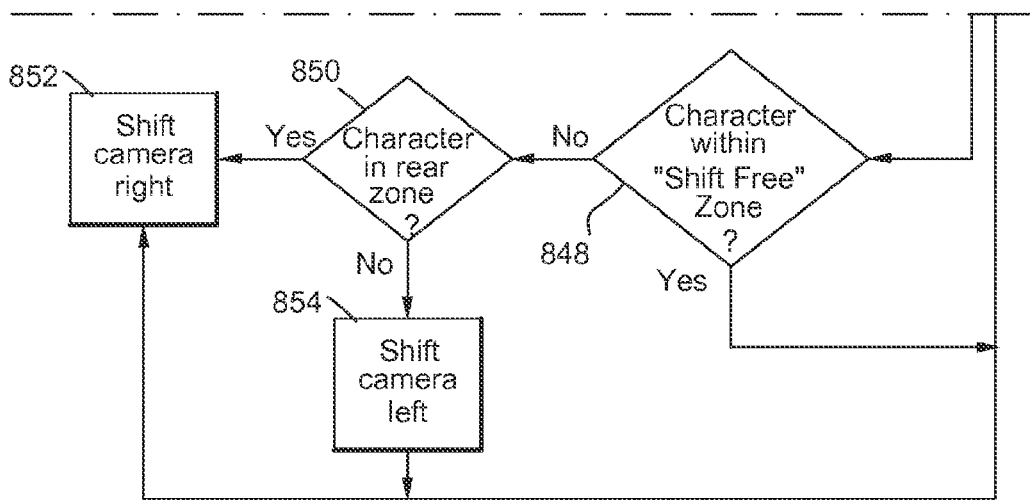

FIG. 16D shows a third exemplary screen that might be shown if the character has reached position D. Here the character is almost opposite the camera position, but has not quite reached 180° away. Now the target appears to be in the foreground relative to the character, and the character is about to pass behind the target. While the target is smaller in size than the character in this exemplary display, it would be possible for a character to be attacking a target that is much larger than the character. If this were the case, then the character moving behind the target could obscure the player's view of the character. Thus, in this exemplary implementation, when the character has reached position D, the camera begins to rotate around the target in the direction that the character is moving, and thus the screen shown in FIG. 16D is maintained as long as the character continues to rotate in the direction 804 indicated by the exemplary controller 800.

Although the screen will typically maintain the display of FIG. 16D when a character has reached a position approximately opposite the camera and continues to move in a rotational direction around the target, it is possible for a user to manipulate a controller such that the character does pass behind the target and such that the target does obstruct the view of the character. This effect may also occur with a moving target (as opposed to the stationary one shown here), since the target may pass in front of the character and between the camera during its motion. In that instance, the camera view would quickly switch to almost a mirror image of the view shown in FIG. 16D, placing the target on a left side of the character. If the path of rotation continued, the camera could then remain fixed and the character would rotate to a position opposite position C (and a display that was the mirror of FIG. 16C might be shown) and then rotate to a position close to that of position B (and a display that was the mirror of FIG. 16B might be shown, with the camera looking over the character's left shoulder. Such fast switching allows the character to be obscured for only a limited period of time if it moves behind a target. At the same time, once the new camera position is obtained, if the character is moving in the same direction, then the relatively stationary position of the new camera allows the player to sort out the shift and observe the scene containing both the character and the target, now on opposite sides.

In the automatic camera positioning of this exemplary implementation, the camera's automatic following of the character at a point just before the character would be obscured allows the player to constantly see the character. Thus, instead of having to manually adjust the camera to show various perspective, the simple rotation of the camera to keep the player shown frees up the player's concentration of focus on attacking the enemy. Since this exemplary implementation also chooses a view that shows both character and target, players don't have to be concerned about selecting an improper camera view at a critical moment of a fight and thus being unable to see the character. Rather, by allowing game controlled camera motion, the player can rely on the game to show a proper and useful view.

FIGS. 17A-17C show another plurality of exemplary third person viewpoints when a game is in a lock on targeting mode according to an exemplary illustrative non-limiting implementation. In these exemplary viewpoints, the player moves the character 504 from a position B' to the left of a target 702 to a position C' to the right of a target 702 across an invisible center plane 720.

FIG. 17B shows an exemplary initial position wherein the character 504 is at a position B' to the left of a target 702. The character is shown from a perspective over the character's right shoulder by camera 750. Here, as the character moves towards a center plane 720, the camera 750 may move with the character, so as to attempt to prevent the character from passing in front of the camera and completely obscuring the target. Although the camera is moving with the character 504 in this exemplary illustrative non-limiting implementation, as the character 504 approaches a center plane 720 the camera 750 is moving slower than the character, so the character begins to obscure the target. Once the character 504 reaches the center plane 720, the character briefly blocks the target view and then passes over the plane 720. On the other side of the center plane, the camera 750 switches to a view over the character's opposite shoulder, placing the target 702 on the left and the character 504 on the right. This helps minimize character obstruction of the target, since the character is moving to the right and the target is now displayed on the character's left side.

In another exemplary illustrative non-limiting implementation, the camera 750 remains relatively fixed as the character 504 moves between the camera 750 and the target 702 towards the central plane 720. Since the camera can be place near the central plane, the character will still only obscure the view of the target for a short period of time before crossing the central plane, at which point the view would switch to the view from the other camera position, also near the central plane.

FIG. 17C shows an exemplary position where a character 504 has moved from position B' to position C' across plane 720. The camera 750 is now positioned over the character's left shoulder and shows the target 702 on the left side of the character 504. Such switching allows the player to move the character back and forth in front of the enemy and not have to worry about obscuring the enemy from view.

Also shown with FIG. 17A is exemplary controller 800, with joystick 802 having been moved in direction 804 directing the character movement depicted in these exemplary screens.

In this exemplary implementation, automatic camera decision making saves the player from being forced to manually switch a camera when the character crosses in front of a target. The scene would potentially appear awkward if the camera remained in a position over the character's right shoulder while the character was on the right side of the screen, since the target may then be obscured by some or all of the character's body. Instead of forcing the player to manually change the perspective, the camera simply keeps proper sight-lines established by switching shoulders over which it looks as the character crosses a center plane of the target. In this exemplary implementation the center plane is determined by the target, not the center of the screen, allowing the player to ensure that, because of camera swapping, the character should obscure the target for a very limited time, if any. This way, even if the target has moved away from the center of the screen, the player's view of it will remain correct as the character passes across a center plane of the target.

Since the camera makes correct automatic adjustments according to this illustrative implementation, a player can freely run back and forth in front of a foe and focus on the enemy, rather than on the camera-work.

FIGS. 18A-18D show a plurality of exemplary viewpoints of a character shown by a camera when a player has ceased to direct a character motion in a particular direction. As shown in FIGS. 16A-16D, when a game is placed in a lock on mode, a character can move freely around a target position, and continues to do so as long as a directional controller (shown in 16A) directs such movement. When the player stops directing character movement, however, it may be that a character is left in a position whereby additional movement could make it difficult for a player to keep track of a locked on target. One exemplary illustrative non-limiting implementation of automatic camera movement is shown in these FIGS., the movement being designed to help better show both a character and a target on-screen at the same time.

In FIG. 18A, portions of the approximately 180° arc along which a player may move to one side of a target are grayed out. While these areas are only exemplary, in this exemplary implementation roughly the back 90° 724 and the front most 10° 722 are grayed out. According to this exemplary implementation, if the character is within either of these areas 722, 724 and the player stops directing the character motion, the camera 750 will auto adjust to one of two "static" positions B" or D" respectively. The character is also shown in a position C", but from this position, since the character is closer to the camera than the target and not in danger of obscuring the target, the camera will simply show the character where it is left by the player.

FIG. 18B shows an exemplary scene of a forward "static" position of a camera. Here, the player presumably stopped moving the character while the character was in position F, which was within the forward grey area 722. Since the character was possibly obscuring part of the target in this position, the camera automatically shifts to position B", thus showing the character 504 on the right side of the screen and the target 702 on the left side of the screen, with neither one obscured. The camera shift speed may depend on a variety of factors and can be varied as needed for a particular game.

FIG. 18C shows an exemplary scene of a "shift-free" zone, wherein the player can freely move and leave the character 504. Here, the character is closer to the camera than the target 702, and to well the left of the target. In this area, when the player stops directing character movement, the scene remains relatively the same (slight camera shifts may occur to account for terrain or other potential obstacles). The size of this zone can also vary with the relative character and target sizes, as well as varying with the proximity of the character to the target. For example, if the character were attacking a very small target at very close proximity, then position B" and most positions from B" to D" might not be desirable as the character may obscure portions, if not all, of the target. In this instance, the camera may automatically shift to position D", where the character and target are shown at opposite positions and a similar depth, to avoid possibly obscuring the target.

FIG. 18D shows an exemplary rearward "static" position of a camera. In this exemplary implementation, the player stopped moving the character while it was at a position E. Since the character was in the background at this point, the camera automatically adjusts to bring the character to an "even" position with the target, thus placing the character in the foreground again. This way, if a character is running behind a target to attack a tail or rear weak spot, and then the player desires to focus attention on attacking that area, the player can release the control designating movement around the target and have the view rotated such that a previously hidden rear portion of the target onto which the character was locked is now displayed oppositional to the character and in plain sight. Thus, if a target had multiple zones for attacking, the player could lock onto an appropriate zone and focus on moving the character into position for the attack and then release the movement designation control and focus efforts on attacking the now shown portion. These automatic camera shifts help keep the action and locked-on target visible to a player when the character is not maneuvering for position.

FIG. 19 shows an exemplary flow chart for camera control decisions while a game is in lock on mode. After beginning lock on mode (block 801) the game must determine in which initial position to display the character. If the character is, in the movement mode, to the right of the central plane (decision block 803) then the game displays the character in lock on with the initial camera over the character's left shoulder (block 830), else the game displays the character with the camera over the character's right shoulder (block 805). In this exemplary flow chart, all displays shown in blocks on the left half of the chart are done with the camera between an object and a character left of an object (i.e. camera over the character's right shoulder), and all displays on the right half of the chart are done with the camera between an object and a character to the right of an object. Crossing over from the right side to the left, or vice versa, means that the character has crossed the center plane and the camera has switched positions to the corresponding position listed above. Additionally, according to this illustrative exemplary non-limiting implementation, regardless of where the player is in the movement mode before entering lock on mode (for example, a character can be completely blocked by a potential target object in the moving view), once lock on is selected the camera rotates to a position similar to that shown in FIG. 18B (or the mirror image of that FIG., depending on which side the character is on). Different initial starting positions could be used, however.

After displaying the character in initial position with the camera over the right shoulder (block 805), the game checks to see if the player directed character movement (decision block 806). If the player did direct movement, the game must then determine if the movement was rightward or not (decision block 808) (forward and backward movement do not generally cause camera movement in lock-on mode except zooms to prevent character from moving offscreen, although additional camera motion could be applied for these character movements).

If the character was moved right, the game displays the character moving to his right (block 810) and then checks to see if the character crosses over the central plane (decision block 812). If the character does not cross over the central plane, the game checks for continued movement indication (block 806), but if the character does cross over the central plane then the camera perspective changes and the character is shown moving to his right still (block 840), but with the camera now over his left shoulder and the target on the left side of the screen.

If the character was not moved right (at decision block 808) then the character is shown moving to his left (block 814). The game must then determine if the turning point was reached (decision block 816). If not, then the game returns to checking for movement (decision block 806). If the turning point was reached, then the camera itself begins to shift left around the target (block 818) as the character continues to move in that direction. This has the effect of causing the scene to rotate, preventing the character from moving behind the target (although the character can still be maneuvered behind the target, such maneuvering just may take extra work). As the camera is shifted (block 818) the game must also determine if the central plane has been crossed behind the target (decision block 820). If the plane has not been crossed, the game returns to detecting movement (decision block 806), but if the plane is crossed then the character continues to be displayed moving left (block 836) only from the other camera position, such that the target is now on the left side of the screen In this instance, since the character is opposite the camera and facing the camera, the target is on the screen's left side, while the character moves to his left (or the screen's right side).

If no character motion is detected at decision block 806, then the game must determine if the camera needs to be automatically moved to a better position. First, the game checks to see if the character is in a "shift-free" zone (decision block 822) (such as the exemplary zone between positions B" and D" shown in FIG. 18A). If the character is in such a zone, the camera does not shift, but rather shows the scene as is and returns to checking for movement (decision block 806). If the character is not in a shift-free zone, then the camera must determine if the character is in the rear zone (decision block 824). If the character is in the rear zone, then the camera is shifted left around the target by some degree (block 826), otherwise, the camera is shifted right around the target by some degree (block 828). In either case, the entire shift does not have to take place at this point, the camera may be moved by a small amount and then the game can check for movement again (decision block 806). In this way, the camera may only return to a "static" position if the character is left unmoved for several cycles of this determination/move.

Alternatively, after displaying the character in initial position with the camera over the left shoulder (block 830), the game checks to see if the player directed character movement (decision block 832). If the player did direct movement, the game must then determine if the movement was leftward or not (decision block 834) (forward and backward movement do not generally cause camera movement in lock-on mode except zooms to prevent character from moving offscreen, although additional motion could be applied for these movements).

If the character was moved left, the game displays the character moving to his left (block 836) and then checks to see if the character crosses over the central plane (decision block 838). If the character does not cross over the central plane, the game checks for continued movement indication (block 832), but if the character does cross over the central plane then the camera perspective changes and the character is shown moving to his left still (block 814), but with the camera now over his right shoulder and the target on the right side of the screen.

If the character was not moved left (at decision block 832) then the character is shown moving to his right (block 840). The game must then determine if the turning point was reached (decision block 842). If not, then the game returns to checking for movement (decision block 832). If the turning point was reached, then the camera itself begins to shift right around the target (block 844) as the character continues to move in that direction. This has the effect of causing the scene to rotate, preventing the character from moving behind the target (although the character can still be maneuvered behind the target, such maneuvering just may take extra work). As the camera is shifted (block 844) the game must also determine if the central plane has been crossed behind the target (decision block 846). If the plane has not been crossed, the game returns to detecting movement (decision block 832), but if the plane is crossed then the character continues to be displayed moving right (block 810) only from the other camera position, such that the target is now on the right side of the screen In this instance, since the character is opposite the camera and facing the camera, the target is on the screen's right side, while the character moves to his right (or the screen's left side).

If no character motion is detected at decision block 832, then the game must determine if the camera needs to be automatically moved to a better position. First, the game checks to see if the character is in a "shift-free" zone (decision block 848) (such as the exemplary zone shown between positions B" and D" in FIG. 18A). If the character is in such a zone, the camera does not shift, but rather shows the scene as is and returns to checking for movement (decision block 832). If the character is not in a shift-free zone, then the camera must determine if the character is in the rear zone (decision block 850). If the character is in the rear zone, then the camera is shifted right around the target by some degree (block 852), otherwise, the camera is shifted left around the target by some degree (block 854). In either case, the entire shift does not have to take place at this point, the camera may be moved by a small amount and then the game can check for movement again (decision block 832).

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the scope of the appended claims.

We claim:

1. A method of using at least one hardware processor for specifying a virtual camera position in a virtual 3-D space, the method comprising:
    displaying, to a screen of a display device, a 3-D space from the perspective of the virtual camera, the displayed 3-D space including a virtual game character;
    detecting at least one pointing input that is controllable by a player,
    detecting a user input indicating initiation of a free targeting mode;
    controlling said game character to assume an aiming position in accordance with initiation of the free targeting mode;
    controlling, using the least one hardware processor, said game character to aim at a location or in a direction within the 3-D space in accordance with the at least one pointing input;
    displaying, in accordance with the at least one pointing input, a targeting marker at a location(s) on the display area;
    determining where the targeting marker is located relative to where the game character is shown on the screen of the display device; and
    automatically selecting, using the at least one processor, between a first perspective and a second perspective different from said first perspective for viewing said game character in said aiming position as a result of determining the targeting marker overlaps where the video game character is displayed on the screen of the display device.

2. The method of claim 1, wherein the determining also determines if the pointing input is on a right side or a left side of the virtual game character, the method further comprising:
    displaying a first perspective of the 3-D space in accordance with the determined left side, wherein the virtual game character is fixedly positioned in a first aiming position; and
    displaying a second perspective of the 3-D space different from said first perspective in accordance with the determined right side, wherein the virtual game character is fixedly positioned in a second aiming position different from the first aiming position.

3. The method of claim 2, wherein the first aiming position is displayed in the substantially lower right corner of the screen of the display device and the second aiming position is the substantially lower left corner of the screen.

4. The method of claim 2, further comprising:
    accepting player provided input to freely control the pointing input while the first and/or second perspectives are displayed;
    displaying a virtual character-held object in accordance with the pointing input.

5. The method of claim 4, further comprising:
    while the first perspective is displayed, determining if the targeting marker is moved past a predetermined rightwards position in the 3-D space; and
    if the targeting marker is determined to have moved past the predetermined right-wards position, displaying the second perspective of the 3-D space.

6. The method of claim 4, further comprising:
    while the second perspective is displayed, determining if the targeting marker is moved past a predetermined leftwards position in the 3-D space; and
    if the targeting marker is determined to have moved past the predetermined left-wards position, displaying the first perspective of the 3-D space.

7. The method of claim 6, wherein the predetermined leftwards position corresponds to a virtual plane running down a vertical center of the virtual game character.

8. A non-transitory computer readable storage medium storing instructions for positioning and/or orienting a virtual camera in a virtual three-dimensional (3D) world on a computing system that includes at least one processor, the stored instructions comprising instructions, when executed by the at least one processor, configured to cause the computing system to:
    output a first image to a display device that is based on a first view perspective of a virtual 3D world provided via the virtual camera, the first view perspective including a virtual object that is located within the virtual 3D world;
    receive a first user input that indicates a first position on the display device and within the first image displayed thereon;
    output, in accordance with the first position, a targeting marker to the display device at a location(s) on the display device that correspond to where the virtual object is targeting within the virtual 3D world;
    perform a comparison that is based on where the virtual object is located within a field of view of the virtual camera in the first view perspective to where the targeting marker is concurrently displayed with the virtual object on the display device;
    adjust the virtual camera from the first view perspective to a second view perspective of the virtual 3D world based on the performed comparison, the second view perspective being different from the first view perspective, where the performed comparison determines that the concurrently displayed targeting marker visually overlaps where the virtual object is displayed on the display device;
    generate a second image in accordance with the adjusted virtual camera; and
    output the generated second image to the display device.

9. The medium of claim 8, wherein the stored instructions are further configured to:
    receive a second user input that indicates a second position on the display device, the second position being on a first side of the virtual object and the first position being on a different side of the virtual object;

adjust the virtual camera based on another comparison that is in accordance with the indicated second position relative to a location of the virtual object within the field of view of the virtual camera; and output a third image, to the display device, that is based on a third view of the virtual 3D world provided via the adjusted virtual camera based on the another comparison, the third view including a further different perspective of the virtual object the first and second views.

10. The medium of claim 8, wherein the instructions are further configured to determine a side of a virtual boundary that the indicated first position is located, wherein the comparison is further based on the determined side.

11. A computing system for providing a plurality of third-person perspectives of a video game object that is located in a virtual three-dimensional world, the plurality of third-person perspectives including a first third-person perspective and a second third-person perspective, the system comprising:

a display apparatus configured to display images of the virtual three-dimensional world on a display area as viewed through a virtual camera at the plurality of third-person perspectives;

a user input apparatus that is configured to indicate positions on the display area of the display apparatus; and a processing system that includes at least one processor, the processing system configured to:

set the virtual camera at the first third-person perspective;

output images for display in the display area in accordance with the set virtual camera being at the first third-person perspective, the images including a visual targeting indicator;

while the virtual camera is set at the first third-person perspective, receive inputs from the user input apparatus that indicate respective positions in the display area, the respective positions corresponding to targeted locations and/or directions within the virtual three-dimensional world, where the visual targeting indicator is moved within the display area so as to correspond to the indicated respective positions;

determine that the visual targeting indicator is displayed within the display area at a position that overlaps where the video game object is displayed within the display area;

switch the virtual camera to a second third-person perspective from the first third-person perspective in accordance with the determination that the visual targeting indicator overlaps where the video game object is displayed within the display area; and display images in accordance with the switched virtual camera that is at the second third-person perspective.

12. The system of claim 11, wherein the determination over overlap includes a determination that the visual targeting indicator has crossed a boundary that includes a virtual plane located in the virtual three-dimensional world that extends from or through the video game object.

13. The system of claim 12, wherein the virtual plane extends from the virtual camera and through the video game object.

14. The system of claim 12, wherein the processing system is further configured to position the boundary as relative to the virtual camera.

15. The system of claim 11, wherein switching the virtual camera to the second third-person perspective from the first third-person perspective includes adjusting the at least one of position, viewing direction, and/or field of view of the virtual camera.

16. A method of selecting over-the-shoulder perspectives of a video game character, the method comprising:

displaying, on a display area of a display apparatus, an image of the video game character that is located in a virtual world as viewed from a first over-the-shoulder perspective out of the over-the-shoulder perspectives;

while the image of the video game character is displayed on the display area, receiving input, via a user input device, indicating a position on the display area;

displaying, in accordance with the indicated position, a targeting marker at a location(s) on the display area and setting the video game character to target a location within the virtual world in accordance with the indicated position;

determining that the location of the targeting marker overlaps where the video game character is displayed within the display area of the display apparatus;

selecting, by using at least one processor of a computing system, a second over-the-shoulder perspective out of the over-the-shoulder perspectives based on determination that the targeting marker overlaps where the video game character is displayed within the display area of the display apparatus; and adjusting, by using at least one processor of the computing system, the image that is displayed in the display area in accordance with the selected second over-the-shoulder perspective.

* * * * *